United States Patent
Takahashi et al.

[15] 3,676,470
[45] July 11, 1972

[54] 1,6-OCTADIENE DERIVATIVES AND THE PREPARATION THEREOF

[72] Inventors: Kuniyuki Takahashi; Go Hata; Akihisa Miyake, all of Kamakura-shi, Japan

[73] Assignee: Toray Industries, Inc., Tokyo, Japan

[22] Filed: May 27, 1968

[21] Appl. No.: 732,108

[30] Foreign Application Priority Data

May 26, 1967 Japan................................42/33114
Aug. 23, 1967 Japan................................42/53691
Dec. 19, 1967 Japan................................42/81022
Jan. 20, 1968 Japan.................................43/2989
March 4, 1968 Japan................................43/13609

[52] U.S. Cl..........................260/410, 260/404, 260/404.5, 260/405, 260/410.5, 260/410.9 R, 260/464, 260/465 K, 260/465 H, 260/465.1, 260/465.8, 260/465.9, 260/468 R, 260/475 R, 260/485 R, 260/557 R, 260/558 R, 260/586 R, 260/590, 260/593 R, 260/598, 260/599, 260/601 R, 260/607 A, 260/644, 260/645

[51] Int. Cl........................................................C11c 3/00
[58] Field of Search...............................260/405–409, 410.9

[56] References Cited

UNITED STATES PATENTS 3,534,088 10/1970 Bryant et al. .......................260/410.9
3,282,832 11/1966 Hey et al............................260/410.9
2,816,917 12/1957 Hansley et al. .......................260/533

FOREIGN PATENTS OR APPLICATIONS 788,302 12/1957 Great Britain

OTHER PUBLICATIONS

Maehleidt et al., " Lower Alkylesters of B-cyclocitrylidenefluoroacetic Acid and B-ionylidenefluoroacetic Acid" Chem Abst. vol. 66 (1967) 55609.
Allen et al., " Synthetic Aspects of Free-Radical Addition. I Radical Alkylation of Malonic Ester and Related Compounds" Chem Abst. vol. 58 (1963) 445b

*Primary Examiner*—Lewis Gotts
*Assistant Examiner*—Catherine L. Mills
*Attorney*—Sughrue, Rothwell, Mion, Zinn & Macpeak

[57] ABSTRACT

A compound represented by the general formula

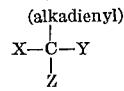

wherein X and Y each represent an electron attracting group and Z represents a hydrogen atom, a mono-valent hydrocarbon radical, a di-valent hydrocarbon radical bonded to X or Y, or an alkadienyl radical represented by the formula $-CH_2-CH=CH-CH_2CH_2CH_2CH=CH_2$ or alkyl-substituted derivatives thereof, and a process for preparing said compounds by adding a 1,3-diene to an active methylene compound or hydrocarbon-substituted methylene compound having the electron attracting groups X and Y as represented by the general formula

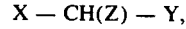

wherein X, Y and Z have the same meaning as above, using a palladium compound or a platinum compound as catalyst.

8 Claims, No Drawings

1,6-OCTADIENE DERIVATIVES AND THE PREPARATION THEREOF

BACKGROUND OF THE INVENTION

The compounds of this invention are useful as intermediates for preparing surface active agents, lubricants, cosmetic perfumes, and the like and as a comonomer. However, there has been little investigation concerning these types of compounds and the production thereof.

Therefore, the inventors have studied these compounds and processes for preparing the same and have discovered the novel and useful compounds together with a process for preparing such compounds economically and effectively.

SUMMARY OF THE INVENTION

The aforesaid novel compounds of the present invention may be prepared by reacting a compound represented by the general formula $$X - CH(Z) - Y,$$

wherein X and Y each represents CHO, COR', $CO_2R''$, $SO_2R'''$, $CON(R'''')_2$, CN or $NO_2$; where R', R'' and R''', each represents a monovalent hydrocarbon radical, R'''' represents a member selected from the group consisting of hydrogen and monovalent hydrocarbon radicals; R' may also be a divalent hydrocarbon radical bonded to Z when X or Y is COR'; and Z represents a hydrogen atom, an alkyl radical, a cycloalkyl radical, an aryl radical, or a divalent hydrocarbon radical bonded to X or Y when X or Y is COR'; with a 1,3-diene compound represented by the general formula $$\begin{array}{c} R_1 \quad R_2 \quad R_3 \\ CH_2=C-C=CH \end{array}$$

wherein $R_1$, $R_2$ and $R_3$ each represents a hydrogen atom or an alkyl radical; in the presence of a palladium compound or a platinum compound at a temperature of 0° to 250° C.

DETAILED DESCRIPTION OF THE INVENTION

There are no particular limitations as to the hydro-carbon radicals represented by R', R'', R''', and R'''' in the aforesaid definitions but in general there may preferably be employed as the hydrocarbon radicals, aliphatic groups having one–10 carbon atoms, alicyclic groups having six–10 carbon atoms, aromatic groups having six–10 carbon atoms, and alkylene groups having two–10 carbon atoms. Also, there are no particular limitations as to the alkyl group, the cyclo-alkyl group, the aryl group and the alkylene group employed and defined in the aforesaid general formulas; but there may be preferably used an alkyl group having one–eight carbon atoms, a cycloalkyl group having six–eight carbon atoms, and an aryl group having six–eight carbon atoms. Moreover, these hydrocarbon radicals may be substituted with such substituents as halogen and nitro groups, and, when X or Y is COR', R' may be bonded to Z and may preferably be combined together to form an alkylene group represented by the formula $-(CH_2)-_n$, where $n$ is preferably equal to two–18.

Furthermore, there are no particular limitations as to $R_1$, $R_2$, and $R_3$ in the aforesaid definitions but in general there may be preferably be employed hydrogen atoms or alkyl radicals having six or less carbon atoms.

In the reaction of this invention, the modes of the addition reaction vary with the structures of the 1,3-diene compounds employed and may be classified into three categories: addition reaction of symmetrical 1,3-diene compounds such as butadiene; that of internally unsymmetrical 1,3-diene compounds such as isoprene; and finally, that of terminally unsymmetrical 1,3-diene compounds such as 1,3-pentadiene.

These three kinds of reaction will be explained schematically below.

1. The reaction of symmetrical 1,3-diene compounds, for example, butadiene;

A. When Z is a hydrocarbon radical;

$$X-CH(Z)-Y + 2CH_2=CH-CH=CH_2 \longrightarrow$$
$$\begin{array}{c} X \\ | \\ Z-C-CH_2CH=CHCH_2CH_2CH_2-CH=CH-CH_2 \\ | \\ Y \end{array} \quad (I)$$

B. When Z is a hydrogen atom;

$$X-CH_2-Y + 2CH_2=CH-CH=CH_2 \longrightarrow$$
$$\begin{array}{c} X \\ | \\ H-C-CH_2-CH=CH-CH_2-CH_2-CH_2-CH=CH_2 \\ | \\ Y \end{array} \quad (I')$$

or $$X-CH_2-Y + 4CH_2=CH-CH=CH_2 \longrightarrow$$
$$\begin{array}{c} CH_2-CH=CH-CH_2-CH_2-CH_2-CH=CH_2 \\ | \\ X-C-Y \\ | \\ CH_2-CH=CH-CH_2-CH_2-CH_2-CH=CH_2 \end{array} \quad (I'')$$

2. The reaction of internally unsymmetrical 1,3-diene compounds, for example, isoprene;

A. When Z is a hydrocarbon radical;

$$X-CH(Z)-Y + 2CH_2=\overset{CH_3}{\underset{|}{C}}-CH=CH_2 \longrightarrow$$
$$\begin{array}{c} X \quad CH_3 \quad\quad\quad CH_3 \\ | \quad | \quad\quad\quad | \\ Z-C-CH_2-C=CH-CH_2-CH_2-CH_2-C=CH_2 \\ | \\ Y \end{array} \quad (II)$$

B. When Z is a hydrogen atom;

$$X-CH_2-Y + 2CH_2=\overset{CH_3}{\underset{|}{C}}-CH=CH_2 \longrightarrow$$
$$\begin{array}{c} X \quad CH_3 \quad\quad\quad CH_3 \\ | \quad | \quad\quad\quad | \\ H-C-CH_2-C=CH-CH_2-CH_2-CH_2-C=CH_2 \\ | \\ Y \end{array} \quad (II')$$

or $$X-CH_2-Y + 4CH_2=C-CH=CH_2 \longrightarrow$$
$$\begin{array}{c} CH_2-C=CH-CH_2-CH_2-CH_2-C=CH_2 \\ | \quad\quad\quad\quad\quad\quad\quad\quad\quad\quad | \\ CH_3 \quad\quad\quad\quad\quad\quad\quad\quad CH_3 \\ X-C-Y \\ CH_2-C=CH-CH_2-CH_2-CH_2-C=CH_2 \\ | \quad\quad\quad\quad\quad\quad\quad\quad\quad\quad | \\ CH_3 \quad\quad\quad\quad\quad\quad\quad\quad CH_3 \end{array} \quad (II'')$$

3. The reaction of terminally unsymmetrical 1,3-diene compounds, for example, 1,3-pentadiene;

A. When Z is a hydrocarbon radical;

$$X-CH(Z)-Y + 2CH_2=CH-CH=CHCH_3 \longrightarrow$$
$$\begin{array}{c} X \quad CH_3 \quad\quad\quad CH_3 \\ | \quad | \quad\quad\quad | \\ Z-C-CH-CH=CH-CH_2-CH-CH_2-CH=CH_2 \\ | \\ Y \end{array} \quad (III)$$

B. When Z is a hydrogen atom;

$$X-CH_2-Y + 2CH_2=CH-CH=CHCH_3 \longrightarrow$$
$$\begin{array}{c} X \\ | \\ H-C-CHCH-CH=CH-CH_2-CH-CH_2-CH=CH_2 \\ | \quad | \quad\quad\quad\quad\quad\quad | \\ Y \quad CH_3 \quad\quad\quad\quad\quad CH_3 \end{array} \quad (III')$$

or

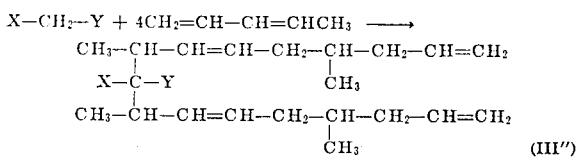

$$\text{(III'')}$$

In the process of this invention, as described above, there are three types of modes of the addition reaction depending on the structure of one of the starting materials, i.e., the 1,3-diene, but the main products in all these reactions are compounds with 2,7-alkadienyl radicals.

As is clear from the aforesaid reaction schemes, by contacting the compound represented by the general formula X — CH(Z)—Y having a methylene group or a substituted methylene group, said group having at least one hydrogen atom activated by the electron attractive groups represented by X and Y in the aforesaid formula and the 1,3-diene compound defined as above in the presence of a palladium compound or a platinum compound as catalyst, the above-mentioned addition reaction occurs and the aforesaid novel compound of the present invention can be obtained.

As the starting material employed in the present invention and represented by the formula X — CH(Z) — Y, there may be employed any compound having at least one hydrogen atom on the carbon atom bonded to the electron attracting group X and Y.

As preferable examples of such compounds, there may be cited αγ-dicarbonyl compounds such as $CH_3COCH_2COCH_3$,

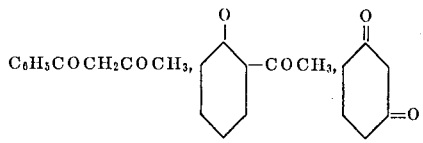

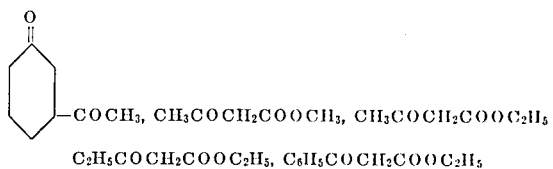

$C_2H_5COCH_2COOC_2H_5$, $C_6H_5COCH_2COOC_2H_5$

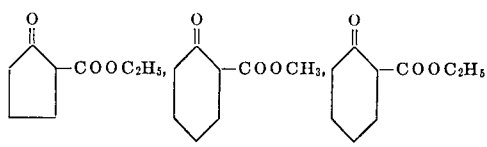

$CH_3COCH(CH_3)COOC_2H_5$, $CH_2(COOCH_3)_2$
$CH_2(COOC_2H_5)_2$, $CH_2(COOC_6H_5)_2$, $CH_3CH(COOC_2H_5)_2$

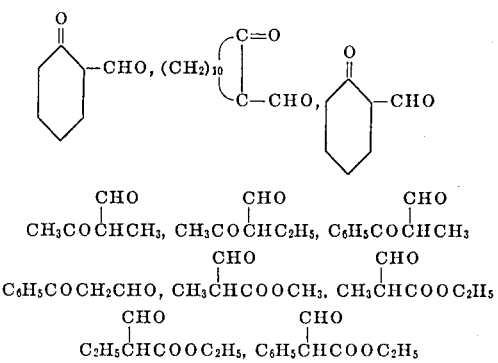

CHO         CHO         CHO
|           |           |
$CH_3COCHCH_3$, $CH_3COCHC_2H_5$, $C_6H_5COCHCH_3$
                CHO         CHO
                |           |
$C_6H_5COCH_2CHO$, $CH_3CHCOOCH_3$, $CH_3CHCOOC_2H_5$
        CHO         CHO
        |           |
    $C_2H_5CHCOOC_2H_5$, $C_6H_5CHCOOC_2H_5$ and

CHO
|
$CH_2COOC_2H_5$ cyano compounds such as $NCCH_2CN$, $NCCH_2COOCH_3$, $NCCH_2COOC_4d09$, $NCCH_2COC_2H_5$, $NCCH(CH_3)COCH_3$, $NCCH(C_6H_5COCH_3$, $NCCH_2COC_6H_5$, $NCCH_2NO_2$,

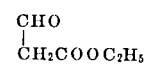

$NC-CH_2CONH_2$, $NC-CH_2CON(C_2H_5)_2$, $NC-CH_2CONHC_2CH5$, $NC-CH_2CON(CH_3)_2$, $NC-CH_2CONHC_6H_5$; nitro compounds such as $NO_2CH_2COOCH_3$, $NO_2CH_2COOC_2H_5$, $NO_2CH(CH_3)NO_2$, $NO_2CH_2COOC_8H_{17}$, $NO_2CH_2COC_6H_5$ and

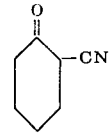

; sulfonyl compounds such as $C_6H_5SO_2CH_2SO_2C_6H_5$, $C_6H_5SO_2CH_2COOC_2cq5$, $C_6H_5SO_2CH_2COOCH_3$, $C_6H_5SO_2CH(C_2H_5)COOC_2H_5$, $CH_3SO_2CH_2COC_6H_5$, $C_6H_5SO_2CH_2CONH_2$, p—$CH_3$—$C_6H_4SO_2CH_2CONH_2$, n—$C_4H_9SO_2CH_2CONH_2$, $C_6H_5SOCH_2CON(CH_3)_2$; and amide compounds such as $H_2NCO-CH_2-CONH_2$ and $C_6H_5HN-COCH_2-CONHC_6H_5$.

On the other hand, as the 1,3-diene which is the other starting material for preparing the compounds of this invention, those having only internal double bonds are generally not preferable, but any 1,3-dienes having at least one terminal double bond may be employed with no limitation as to the number of carbon atoms. Also, the 1,3-dienes may be substituted by groups inactive to the reaction. As such 1,3-dienes, there may be used generally 1,3-butadiene, an alkyl-substituted 1,3-butadiene, and the like, preferably 1,3-butadiene, isoprene, 1,3-pentadiene, 1,3-heptadiene, 1,3-octadiene, 1,3-nonadiene, 2,3-dimethylbutadiene, 2,3-diethylbutadiene, 2,3-dibutylbutadiene, and the like.

There is no criticality as to the amount of the 1,3-diene relative to the compound represented by the general formula X— CH(Z)—Y in the reaction; however, an excessive amount of the 1,3-diene is usually used and in particular 1–20 mols, preferably 2–6 mols of the 1,3-diene is employed per mol of the said co-reactant.

Furthermore, for obtaining the product having four molecules of the 1,3-diene as shown in reaction Formula (I'')–(III) mentioned above, it is necessary to use more than 4 mols of the 1,3-diene per mol of the compound represented by the formula X—$CH_2$—Y.

In order to prepare the novel compound of this invention using the aforesaid two kinds of starting materials, it is necessary to react the two starting materials in the presence of a palladium compound or a platinum compound as catalyst. As yet, the mechanism of the reaction is not completely understood, however, it is theorized that the remarkable action of the catalyst may be caused by the properties of the metal itself in the metal compound as in the cases of various conventionally known reactions using noble metal catalysts. It is to be understood that we do not intend to be bound by this theory. In carrying out the reaction using various compounds of these noble metals as catalysts, it has been found that all of these compounds showed almost the same catalytic actions, some of these experiments being shown below. Therefore, it will be understood that the particular form of the compound of platinum or palladium is not particularly critical in the process of this invention and any platinum compounds and palladium compounds may be employed effectively.

As the palladium catalyst or the platinum catalyst, there may preferably be used salts of these noble metals and complex compounds of these salts with tri-valent phosphorus compounds, arsenic compounds, or antimony compounds. As examples of the palladium compounds, there may be cited inorganic salts, such as PdCl₂, PdI₂, PdBr₂, Pd(NO₃)₂, Pd(CNS)₂, Pd(CN)₂, and the like; organic salts such as Pd(OCOCH₃)₂, Pd(OCOCH₂CH₃₂), and the like; inorganic complex salts such as H₂(PdCl₄), H₂(PdCl₆); complex compounds with tri-valent phosphorus and arsenic and antimony complex compounds such as PdCl₂(PCl₃)₂, PdCl₂[P(OCH₃)₃]₂, PdCl₂[P(C₆H₅)₃]₂, PdBr₂[P(cycloC₆H₁₁)₃]₂, Pd(NO₃)₂[P(C₆H₅)₃]₂, PdCl₂[As(C₆H₅)₃a[₂, PdCl₂[Sb(C₆H₅)₃]₂, PdBr₂[Sb(C₃H₇)₃]₂, CH₃COPdCl[P(C₂H₅)₃]₂, C₆H₅COPdCl[P(C₂H₅)₃]₂, PdBr₂[P(C₂H₅)₃]₂, CH₃PdBr[,c₂H₅)₃]₂, (CH₃)₂Pd[P(C₂H₅)₃]₂, Pd[P(C₆H₅)₃]₄,

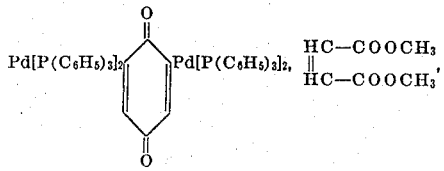

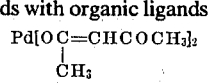

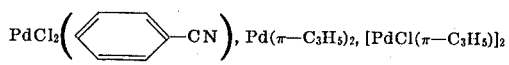

, Pd(π—C₃H₅)Cl.P(C₆H₅)₃, and PdCl₂[P(OC₆H₅)₃]₂; and complex compounds with organic ligands such as Pd[OC=CHCOCH₃]₂
        |
        CH₃

Pd(CO)Cl₂,

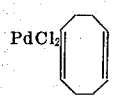, Pd(π—C₃H₅)₂, [PdCl(π—C₃H₅)]₂

[PdCl₂(CH₂ = CH₂)]₂, [PdCl₂(C₆H₅—CH = CH₂)], PdCl₂(CH₂ = CH—CH = CH₂),

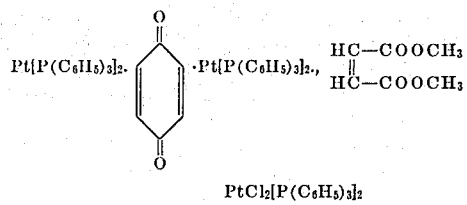

and the like. Also, the preferable examples of the platinum compounds are inorganic and organic salts such as PtBr₂, PtI₂, PtCl₂, Pt(OCOCH₃)₂, Pt(OCOCH₂CH₃)₂ and the like; inorganic complex salts such as H₂PtCl₆ · 6H₂O, K₂PtI₆, K₂Pt(CN)₄ · 3H₂O, K₂PtCl₆, K₂PtCl₄, Na₂PtCl₆ · 6H₂O and the like; complex compounds with tri-valent phosphorus, arsenic and antimony compounds such as [Pt(P(C₆H₅)₃)₄][PtCl₄], [Pt(P(C₂H₅)₃)₄]Cl₂, PtCl₂[As(C₄H₉)₃]₂, PtCl₂[Sb(C₂H₅)₃]₂, Pt[P(C₆H₅)₃]₄, Pt[P(C₆H₅)₃]₃, Pt[P(C₆H₅)₃]₂· ⬡ ·Pt[P(C₆H₅)₃]₂., HC—COOCH₃
                                  ‖
                                  HC—COOCH₃

PtCl₂[P(C₆H₅)₃]₂

, PtCl₂[As(C₆H₅)₃]₂, HPtCl[P(C₆H₅)₃]₂, Pt[P(OC₆H₅)₃]₄, PtCl(π—C₃H₅) · P(C₆H₅)₃, C₂H₅PtCl[P(C₆H₅)₃]₂ and the like; and complex compounds with organic ligands such as Pt(π—C₃H₅)₂, KPtCl₃(CH₂ = CH₂), and K₂PtCl₃(CH₃CH = CH₂).

As nitrogen-containing complex salts of palladium or platinum salts, there may be used amine complexes such as [Pd(NH₃)₄]Cl₂ · H₂O, trans- [Pd(NH₃)₂Cl₂], [Pd(NH₃)₄][PdCl₄], [Pd(NH₃)₄][PdBr₄], trans-[Pd(NH₃)₂Br₂] [Pd(NH₃)I₂], [Pd(NH₃)₄]Br₂ · H₂O, [Pd(NH₃)₂(NO₂)₂], [Pd(NH₃)Cl₂][Pd(NH₃)₂Cl₄], [Pd(NH₃)₂Br₂][Pd(NH₃)₂Br₄], [Pd(NH₃)(SO₃)], [Pd(NH₃)₂(CO₃)], [Pd(NH₃)₂(C₂O₄)], [Pd(NH₃)(OH)₂], [Pd(NH₃)₂Br₂], [Pt(NH₃)₂], [Pt(NH₃)₄]Cl, [Pt(NH₃)₄][PtCl₄], [Pt(NH₃)₄]Cl₂ · H₂O, trans-[Pt(NH₃)₂Cl₂], [Pt(NH₃)₄]Br₂, [Pt(NH₃)₄]Br₂ · H₂O, [Pt(NH₃)₄]I₂ · H₂O, trans-[Pt(NH₃)₂Br₂], trans-[Pt(NH₃)₂I₂], [Pt(NH₃)₃Cl]Cl, [Pt(NH₃)₃Cl][PtCl₄] · H₂O, cis-[Pt(NH₃)₂Cl₂], and [Pt(NH₃)(NO₂)₂]; pyridyl complexes such as [Pd(Py)₂Cl₂], [Pd(Py)₂r₂], [Pd(Py)I₂], [Pt(Py)₂Cl₂], [Pd(Py)₂(NO₂)₂], (wherein Py is

); ethylenediamine complexes such as [Pd(en)Cl₂], [Pd(en)I₂], [Pd(en)Br₂], [Pd(en)₂]Cl₂, [Pd(en)₂]I₂, [Pt(en)Cl₂,] [Pt(en)₂Cl₂, [Pt(en)Br₂], (wherein, en represents H₂NCH₂CHNH₂); dipyridyl complexes such as [Pd(dpy)Cl₂], [Pd(dpy)Br₂, [Pd(dpy) (NO₂)], [Pd(dpy) (CNS)₂], [Pt(dpy)Cl₂] (wherein, dpy represents

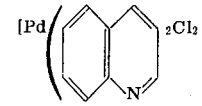

); aromatic or aliphatic amine complexes such [Pd(CH₃NH₂)₂Cl₂], [Pd(CH₃)₂NH₂)Cl₂], [Pd(C₂H₅NH₂)₂Br₂], [Pd(C₄H₉NH₂)₂I], [Pd(C₆H₅NH₂)₂Br₂], [Pd(C₆H₅NHCH₃)₂Cl₂], [Pd(p-NO₂C₆H₄NH₂)₂Cl₂], [Pd(C₇H₇NH₂)₂Cl₂], [Pd(C₂H₄(NHC₆H₅BQ2)Cl₂], [Pt(CH₃NH₂)₂Cl₂], [Pt(C₆H₅NH₂)₂Cl₂]; a [Pd(C₅HNH)₂Cl₂],

[Pd(⬡⬡)₂Cl₂]

[Pd(CON₂H₄)₂Cl₂,][Pd(CH₃C(NOH)C(NOH)CH₃)₂], and the like.

Moreover, as ammonium salts of palladium or platinum, there may preferably be used (NH₄)₂[PdCl₄], (NH₄)₂[PdBr₄], (NH₄)₂bPdI₂], (NH₄)₂[PdCl₆], (NH₄)₂[PtCl₄], (NH₄)₂[PtCl₆], and the like. It is to be understood that the foregoing compounds are exemplary only of the materials which may be used as catalysts.

In the process of this invention, the reaction can proceed rapidly, in particular, when phosphine complex salts of palladium or platinum are employed. When a zero-valent palladium or platinum complexes are employed, it is unnecessary to use the preformed complex. A mixture, obtained by reacting a suitable reducing agent with a palladium or platinum salt in the presence of a tri-valent phosphorus or arsenic compound may be used in situ. In this case, sodium hydride, lithium hydride, lithium aluminum hydride, lithiumborohydride, and hydrazine may be used as the reducing agent.

There is no criticality as to the amount of the catalyst used in the process of this invention but the molar ratio of the compound represented by the general formula Y—CH(Z)—Y to the palladium or platinum compound is usually in the range of 10–50,000. If the amount of the catalyst is below this range, the activity of the catalyst in the reaction is insufficient. A larger amount of the catalyst than the aforesaid range may be employed but the rate of reaction is in-significantly increased thereby rendering the process unprofitable. The preferable molar ratio of the compound represented by the above general formula to the catalyst is in the range of 50–5,000 when the compound is the α,γ-dicarbonyl compound and 50–1,000 when the compound is one of the other compounds than the dicarbonyl compound.

It is most preferable to conduct the reaction of this invention by adding an alkali metal or a basic alkali metal salt as cocatalyst. As the alkali metal or alkali metal compound used in this case, there are preferably used alkali metals such as lithium, sodium, potassium, rubidium, and cesium; alkali metal hydrides; alkali metal carbonates; alkali metal oxides; and compounds represented by general formulas AOM, MCH(CN)₂ and MCH(CN)COOB wherein M represents an alkali metal and A and B each represent a hydrocarbon radical, which may be substituted by a group inactive to the reaction, such as, a halogen atom or a nitro group. In the latter case, an aliphatic group having one–four carbon atoms, an alicyclic group having six–12 carbon atoms may be preferably used although the invention is not limited to these. Moreover, an alkali metal salt of the compound represented by the aforesaid general formula X—CH(Z)—Y, which is one component of the starting materials in this invention may be effectively used as the cocatalyst. Therefore, an alkali metal or an alkali metal salt capable of forming an alkali metal salt of the compound of X—CH(Z)—Y may be employed.

In particular, when the catalyst is a salt of palladium or platinum or complex compounds of these salts with phosphorus, arsenic, antimony, or nitrogen compounds, it is desirable to use an alkali metal or a basic alkali metal salt together in conjunction therewith.

As the alkali metal compound used in the process of this invention, there may be cited LiH, NaH, KH, RbH, $Li_2O$, $Na_2O$, $K_2O$, $Rb_2O$, $Na_2CO_3$, $K_2CO_3$, $Rb_2CO_3$, $C_6H_5ONa$, $C_6H_5Li$, $C_6H_5OK$, $C_6H_5OCs$, p—Cl—$C_6H_4$-ONa, m—Cl—$C_6H_4$ONa, o—Cl—$C_6H_4$ONa, p—Cl—$C_6H_4$ONa, m—$CH_3$—$C_6H_4$ONa, o—$CH_3$—$C_6H_4$OK, p—$NO_2$—$C_6H_4$ONa, p—$C_6H_5$—$C_6H_4$ONa, HO—$C_6H_4$ONa, $CH_3$ONa, $C_2H_5$ONa, $C_2H_5$ORb, $C_6H_{11}$ONa, $CH_2 = CH$—$CH_2$ONa, n—$C_4H_9$OK, t—$C_4H_9$ONa, $NaCH(CN)_2$, $NaCH(CN)CO_2C_2H_5$, and the like although the invention shall not be limited to them by any means.

The amount of the alkali metal or the basic alkali metal salt mentioned above is 0.1–100 mols, preferably 1–20 mols per mol of the palladium or platinum catalyst with which it is employed. If the amount thereof is less than 0.1 mol per one mol of the catalyst, the ability of the compound to increase the activity of the catalyst is insufficient while amounts greater than 100 mols is uneconomical since no further enhancement in the catalyst activity is obtained.

The process of this invention can be very easily carried out. For example, the aforesaid catalyst components are mixed in the -,$\alpha$,$\gamma$-dicarbonyl compound which is one component of the starting materials and then the 1,3-diene is added to the mixture to effect the reaction. In this case, by using a solvent inactive to the reaction, i.e., an aliphatic hydrocarbon, such as hexane, heptane, a cycloaliphatic hydrocarbon such as cyclohexane; an aromatic hydrocarbon, such as benzene, toluene, xylene and the like; or acetone, diethyl ether and the like in an amount equivalent to that of the compound represented by the general formula X—CH(Z)—Y, the reaction can be conducted smoothly. Moreover, the post-treatment of the reaction product is facilitated.

Further, when a small proportion of a phenol is added to the reaction system, the activity of the catalyst is increased and the reaction proceeds rapidly. Accordingly, it is desirable to conduct the reaction by adding 0.1–20 mols of a phenol per mol of the palladium catalyst or the platinum catalyst. If the amount of the phenol is below this range, the ability to increase the activity of the catalyst is insufficient and a larger amount thereof is uneconomical as the activity of the catalyst is not further increased.

As the phenol, there may be preferably used phenol, chlorophenol, dichlorophenol, trichlorophenol, bromophenol, phenylphenol, cresol, xylenol, nitrophenol, hydroquinone, and the like.

The reaction temperature of this invention is generally in the range of 0–250° C. If the temperature is below this range, the rate of reaction is low, while if temperatures above this range are used byproducts tend to form. Particularly preferable temperatures range between 70° and 160° C.

The alkadienyl compounds which are obtained according to the process of this invention are all new compounds and are useful as a component monomer of various copolymers because of the presence of polymerizable double bonds therein, as a starting material for the production of surface active agents because of the presence of hydrophilic electron attracting substituents together with lipophilic hydrocarbon radicals of relatively long chain (in this case, the alkadienyl group); and furthermore, as a starting material for the production of lubricants and cosmetic perfumes.

Particularly useful products according to the process of this invention are those alkadienyl compounds which are obtainable when symmetrical or internally unsymmetrical dienes are used as 1,3-diene component because of the availability of these dienes and because of their high reactivity.

These compounds may be expressed by the following general formula

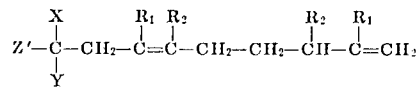

wherein X and Y are as described heretofore and Z′ is the same as Z described heretofore or an alkadienyl group of the general formula

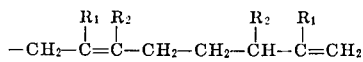

wherein $R_1$ and $R_2$ are as described heretofore. Particularly preferable among these compounds are those in which $R_1$ and $R_2$ are both hydrogen atoms or those in which $R_1$ is a methyl group and $R_2$ is hydrogen.

The process of this invention and the products according to the process of this invention are described in the following examples. However, it is obvious that the present invention is by no means confined to these examples.

EXAMPLE 1

In a 100 ml. autoclave were charged 19.5 g. (0.15 mol) of ethyl acetoacetate, 0.954 g. (9 m. mols) of sodium phenoxide, and 0.531 g. (3 m. mols of palladium chloride. After replacing the air in the autoclave with a 1,3-butadiene gas, 39 ml. (0.45 mol) of liquefied 1,3-butadiene was added thereto followed by stirring for 1 hour at 100° C. By distilling the reaction product thus obtained under reduced pressure, 28.6 g. of ethyl 2-acetyl-4, 9-decadienoate ($CH_2 = CHCH_2CH_2CH_2$—CH = CH—$CH_2CH(COCH_3)$—$CO_2C_2H_5$ having a boiling point of 139° C./5 mm. Hg and $n_D^{25}$ of 1.4580 and 3.8 g. of ethyl 2-acetyl-2-(2,7-octadienyl)-4, 9-decadienoate (($CH_2 = CHCH_2CH_2CH_2CH = CHCH_2)_2C(COCH_3)CO_2C_2H_5$) having a boiling point of 188° C./5 mm. Hg and $n_D^{25}$ of 1.4759 were obtained. When the same procedure was repeated using 0.612 g. (9 m. mols) of sodium ethoxide instead of sodium phenoxide, 12 g. of ethyl 2-acetyl-4, 9-decadienoate was obtained.

EXAMPLE 2

In a 100 ml. autoclave were charged 19.5 g. of ethyl acetoacetate, 2.3 g. (18 m. mols) of p-chlorophenol, and 0.2 G. (9 m. mols) of metallic sodium and after stirring the system for 30 minutes, 0.531 g. (30 m. mols) of palladium chloride and 39 ml. of liquefied 1,3-butadiene were added to the system followed by stirring for 1 hour at 130° C., whereby 28.9 g. of ethyl 2-acetyl-4, 9-decadienoate and 2.9 g. of ethyl 2-acetyl-2-(2,7-octadienyl)-4,9-decadienoate were obtained. When 0.34 g. of metallic potassium was used in lieu of metallic sodium, similar results were obtained.

EXAMPLE 3

In a 100 ml. autoclave were charged 6.5 g. (0.05 mol) ethyl acetoacetate, 0.5 g. of phenol, 0.69 g. of anhydrous potassium carbonate, and 0.18 g. of palladium chloride. After further adding 13 ml. (0.15 mol) of liquefied 1,3-butadiene to the mixture, the system was stirred for 3 hours at 130° C., whereby 7.3 g. of ethyl 2-acetyl-4, 9-decadienoate and 0.9 g. of ethyl 2-acetyl-2-(2, 7-octadienyl)-4, 9-decadienoate were obtained. When 0.21 g. of $PdCl_2(CH_2 = CH_2)$ was used in lieu of palladium chloride, the same results were obtained.

EXAMPLE 4

In 100 ml. autoclave were charged 13 g. of ethyl acetoacetate, 15 ml. of benzene, 0.288 g. (0.25 m. mol) of $Pd[P(C_6H_5)_3]_4$ and 26 ml. of liquefied 1,3-butadiene followed by stirring for 30 minutes at 85° C. to provide 4.8 g. of ethyl 2-acetyl-4, 9-decadienoate.

When 0.25 g. of phenol was added to the reaction mixture having the same composition as above and the system was reacted under the same conditions as above, 10.8 g. of ethyl 2-acetyl-4, 9-decadienoate was obtained.

EXAMPLE 5

In a 100 ml. autoclave were charged 13 g. of ethyl acetoacetate, 15 ml. of benzene, 0.007 g. (0.01 m. mol) of $PdCl_2 [P(C_6H_5)_3]_2$, and 26 ml. of liquefied 1,3-butadiene followed by stirring for 30 minutes at 85° C. to provide 14.0 g. of ethyl 2-acetyl-4, 9-decadienoate and 13.9 g. of ethyl 2-acetyl-2-(2,7-octadienyl)-4, 9-decadienoate.

When the same procedure as above was repeated while using 11.6 g. (0.1 mol) of methyl acetoacetate in lieu of ethyl acetoacetate, 15.8 g. of methyl 2-acetyl-4,9-decadienoate (having a boiling point of 111° C./1.5 mm. Hg and $n_D^{25}$ of 1.4588) and 4.9 g. of methyl 2-acetyl-2-(2,7-octadienyl)-4,9-decadienoate were obtained.

EXAMPLE 6

In a 100 ml. autoclave were charged 11.6 g. (0.1 mol) of methyl acetoacetate, 0.108 g. (2 m. mol) of sodium phenoxide, 0.028 g. (0.04 m. mol) of $PdCl_2(P(C_6H_5)_3)_2$, and 43 ml. (0.5 mol) of liquefied 1,3-butadiene followed by stirring for 10 hours at 85° C. to provide 30.2 g. of methyl 2-acetyl-2-(2, 7-octadienyl)-4, 9-decadienoate.

EXAMPLES 7–30

In a 100 ml. autoclave were charged 19.5 g. of ethyl acetoacetate, 1.40 g. of $PdCl_2(P(C_6H_5)_3)_2$, and 0.64 g. of sodium phenoxide and thereafter 39 ml. of liquefied 1,3-butadiene was added to the mixture followed by stirring for 1 hour at 110° C. to provide 21.0 g. of ethyl 2-acetyl-2-(2,7-octadienyl)-4,9-decadienoate. The same procedure as above was repeated using in lieu of the palladium compound shown above the palladium compounds shown in the following table (Table 1) and the results obtained are shown in Table 1.

TABLE 1

| Example | Palladium Compound (1 mmol) | Product a | (b) |
|---|---|---|---|
| 7 | $PdCl_2[As(n-C_4H_9)_3]_2$ | 26.3 | 2.8 |
| 8 | $PdCl_2[Sb(C_6H_5)_3]_2$ | 18.3 | 0.8 |
| 9 | $[Pd(\pi-C_3H_5)Cl]_2$ | 14.3 | 1.0 |
| 10 | $Pd(\pi-C_3H_5)Cl.P(C_6H_5)_3$ | 23.8 | 14.1 |
| 11 | $PdCl_2[P(OCH_3)_3]_2$ | 26.1 | 5.7 |
| 12 | $PdBr_2[P(n-C_4H_9)_3]_2$ | 18.6 | 20.1 |
| 13 | $Pd(NO_3)_2[P(C_6H_5)_3]_2$ | 17.3 | 22.3 |
| 14 | $Pd(CNS)_2[P(C_6H_5)_3]_2$ | 19.8 | 19.6 |
| 15 | $PdBr_2$ | 29.7 | 3.1 |
| 16 | $PdI_2$ | 29.0 | 3.0 |
| 17 | $Pd(NO_3)_2$ | 28.3 | 2.4 |
| 18 | $Pd(OCOCH_3)_2$ | 29.3 | 4.1 |
| 19 | $H_2[PdCl_4]$ | 21.3 | 3.1 |
| 20 | $H_2[PdCl_6]$ | 23.1 | 3.8 |
| 21 | $Pd(CN)_2$ | 19.1 | 1.0 |
| 22 | $Pd(CNS)_2$ | 27.9 | 4.3 |
| 23 | $Pd(CO)Cl_2$ | 21.3 | 2.4 |
| 24 | $PbBr_2[P(C_2H_5)_3]_2$ | 18.3 | 23.9 |
| 25 | $PdBr_2[P(cycloC_6H_{11})_3]_2$ | 22.1 | 20.9 |
| 26 | $PdBr_2[Sb(C_3H_7)_3]_2$ | 28.4 | 8.6 |
| 27 | $[PdCl_2(CH_2=CH_2)]_2$ | 14.3 | 0.8 |
| 28 | $PdCl_2$  | 16.4 | 1.0 |
| 29 | $Pd(AcAc)_2$* | 22.9 | 20.1 |
| 30 | $CH_3PdBr[P(C_2H_5)_3]_2$ | 28.6 | 17.9 |

*$Pd(AcAc)_2$ Pd(II) acetylacetonate.

a $CH_2=CHCH_2CH_2CH_2CH=CHCH_2CH(COCH_3)CO_2C_2H_5$
b $(CH_2=CHCH_2CH_2CH_2CH=CHCH_2)_2C(COCH_3)CO_2C_2H_5$

EXAMPLE 31

In a 100 ml. autoclave were charged 14.0 g. of 2-acetyl-cyclohexanone, 0.318 g. of sodium phenoxide, and 0.35 g. of $PdCl_2[P(CH_5)_3]_2$. The system was stirred for 2 hours at 90° C. to provide 16.3 g. of 2-acetyl-2-(2,7-octadienyl)-cyclohexanone(having a boiling point of 149° C./3.5 mm. Hg and $n_D^{25}$ of 1,4759). 1,4759

When the same procedure was repeated while using 0.288 g. of $Pd]P(C_6H_5)_3]_4$ instead of the above palladium compound, 13.4 g. of 2-acetyl-2-(2, 7-octadienyl) cyclohexanone was obtained.

EXAMPLE 32

The same procedure as in Example 6 was repeated while using 20.4 g. (0.3 mol) of isoprene in lieu of 1,3-butadiene to provide 27.6 g. of ethyl 2-acetyl-4,9-dimethyl-4,9-decadienoate (having a boiling point of 103°–104° C./0.05 mm. Hg and $n_D^{25}$ of 1.4629.

EXAMPLE 33

In a 100 ml. autoclave were charged 24.0 g. (0.15 mol) of diethyl malonate and 0.425 g. of a complex of triphenyl phosphine and

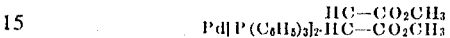

After further adding 39 ml. of liquefied 1,3-butadiene, the system was stirred for 1 hour at 100° C. to provide 24.8 g. of diethyl 2,7-octadienyl malonate (having a boiling point of 134°–135° C./3 mm. Hg and $n_D^{25}$ of 1.4496) and 4.3 g. of diethyl bis(2,7-octadienyl)malonate (having a boiling point of 184°–188° C./3 mm. Hg and $n_D^{25}$ of 1.4672).

When the same procedure as above was repeated while using 13.2 g. (0.1 mol) of dimethyl malonate in lieu of diethyl malonate there was produced 15.8 g. of dimethyl 2,7-octadienyl malonate (having a boiling point of 117° C./1 mm. Hg and $n_D^{25}$ of 1.4563) and 2.5 g. of dimethyl bis(2,7-octadienyl)malonate (having a boiling point of 178° C./1 mm. Hg and $n_D^{25}$ of 1.4735).

EXAMPLE 34

In a 100 ml. autoclave were charged 13 g. (0.1 mol) of ethyl acetoacetate, 0.18 g. (0.25 m. mol) of $PdCl_2(Ph_3P)_2$, 0.29 g. (2.5 m. mols) of sodium phenoxide, 22.4 g. (0.33 mol) of isoprene, and 15 ml. of benzene. The mixture was stirred for 20 hours at 85° C. to provide 22.6 g. of ethyl 2-acetyl-4,9-dimethyl-4,9-decadienoate and 4.8 g. of ethyl 2-acetyl-2-(2,7-dimethyl-2,7-octadienyl)-4,9-dimethyl-4,9-decadienoate (having a boiling point of 160°–162° C./0.01 mm. Hg and $n_D^{25}$ of 1.4910).

EXAMPLE 35

The same procedure as in Example 34 was repeated while using 22.4 g. of 1,3-pentadiene (90 percent in purity) instead of isoprene to provide 8.5 g. of ethyl 2-acetyl-3,7-dimethyl-4,9-decadienoate (having a boiling point of 104°–105° C./0.35 mm. Hg and $n_D^{25}$ of 1.4569.

EXAMPLE 36

The same procedure as in Example 34 was repeated while using 24.6 g. (0.3 mol) of 2,3-dimethyl butadiene instead of isoprene to provide 3.8 g. of ethyl 2-acetyl-4,5,8,9-tetramethyl-4,9-decadienoate (having a boiling point of 122° C./3 mm. Hg and $n_D^{25}$ of 1.4700).

EXAMPLE 37

The same procedure as in Example 34 was repeated while using 10.0 (0.1 mol) of acetylacetone in lieu of ethyl acetoacetate to provide 15.8 g. of 3-(2,7-dimethyl-2,7-octadienyl)-2,4-pentanedione (having a boiling point of 96°–98° C./0.02 mm. Hg and $n_D^{25}$ of 1.4808) and 9.0 g. of 3,3-bis(2,7-dimethyl-2,7-octadienyl)-2,4-pentanedione (having a boiling point of 150°–152° C./$10^{-3}$ mm. Hg and $n_D^{25}$ of 1.4910).

EXAMPLE 38

In a 500 ml. autoclave were charged 72 g. of ethyl malonate, 0.4 g. of sodium, 3.0 g. of phenol, 0.93 g. of triphenyl phosphite, 0.354 g. of palladium chloride and 172 ml. of liquefied butadiene and the system was stirred for 10 hours at 90° C. to provide 130 g. of diethyl bis(2,7-octadienyl) malonate.

EXAMPLE 39

In a 100 ml. autoclave were charged 15.0 g. (0.15 mol) of acetylacetone, 1.1 g. of sodium salt of acetylacetone, 0.35 g. of $PdCl_2[P(C_6H_5)_3]_2$, and 39 ml. of liquefied butadiene. Thereafter, the mixture was stirred for 3 hours at 130° C. to provide 13.1 g. of 3-(2,7-octadienyl)-2,4-pentanedione (having a boiling point of 136° C./7 mm. Hg and $n_D^{25}$ of 1.4800) and 3.8 g. pf 3,3-bis(2,7-octadienyl)-2,4-pentanedione (having a boiling point of 171° C./3 mm. Hg and $n_D^{25}$ of 1.4837.

Further, in a 100 ml. autoclave were charged 4.0 g. (0.036 mol) of 1,3-cyclohexanedione, 0.104 g. (2 m. mols) of sodium methoxide, 0.140 g. (0.2 m. mol) of $PdCl_2(Ph_3P)_2$, and 10 ml. of liquefied butadiene, and then the mixture was stirred for 1 hour at 85° C. to provide 3.6 g. of 2,2-bis(2,7-octadienyl)-1,3-cyclohexanedione (having a boiling point of 138°–141° C./$10^{-3}$ mm. Hg).

EXAMPLE 40

In a 100 ml. autoclave were charged 15.6 g. (0.1 mol) of 2-ethoxycarbonylcyclopentanone, 0.64 g. (6 m. mols) of sodium phenoxide, 1.40 g. (2 m. mols) of $PdCl_2[P(C_6H_5)_3]_2$, and 26 ml. of liquefied butadiene. The system was stirred for 2 hours at 100° C. to provide 15.8 g. of 2-(2,7-octadienyl)-2-ethoxycarbonylcyclopentanone (having a boiling point of 140° C./2 mm. Hg and $n_D^{25}$ of 1.4739).

The above procedure was further repeated while using 13.6 g. of isoprene in lieu of liquefied butadiene to provide 25.4 g. of 2-ethoxycarbonyl-2-(2,7-dimethyl-2,7-octadienyl)-cyclopentanone (having a boiling point of 138°–140° C./0.6 mm. Hg and $n_D^{25}$ of 1.4791).

EXAMPLES 41–47

In a 100 ml. autoclave were charged 13.0 g. of ethyl acetoacetate, 15 ml. of benzene, 0.25 m. mol of a palladium complex shown in Table 2 below, and 26 ml. of liquefied butadiene. The mixture was then stirred for 1 hour at 95° C. The results are shown in Table 2.

TABLE 2

| Example | Palladium complex (0.25 mmole) | (a) | (b) |
|---|---|---|---|
| 41 | $[(C_6H_5O)_3P]_4Pd$ | 10.5 | |
| 42 | $[(p-Cl-C_6H_4)_3P]_4Pd$ | 13.0 | 13.9 |
| 43 | $[p-CH_3-C_6H_4)_3P]_4Pd$ | 17.1 | 4.3 |
| 44 | $[(C_6H_5)_3P]_3Pd$ | 14.8 | 6.1 |
| 45 | $[(C_6H_5)_3As]_4Pd$ | 8.9 | 2.1 |
| 46 | $[PdP(C_6H_5)_3]_2 \begin{array}{c}HCCOOCH_3\\ \| \\ HCCOOCH_3\end{array}$ | 11.0 | 11.7 |
| 47 | $Pd[P(C_6H_5)_3]_2 \begin{array}{c}HC-CO\\ \| \quad\quad\>O\\ HC-CO\end{array}$ | 12.0 | 7.1 | a  $CH_2=CHCH_2CH_2CH_2CH=CHCH_2-\overset{COCH_3}{\underset{}{C}}HCO_2C_2H_5$ b  $(CH_2=CHCH_2CH_2CH_2CH=CHCH_2)_2-\overset{COCH_3}{\underset{}{C}}-CO_2C_2H_5$

EXAMPLE 48

In a 100 ml. autoclave were charged 15 ml. of benzene, 13.0 g. of ethyl acetoacetate, 0.318 g. of sodium phenoxide, 0.288 g. of $Pd[P(C_6H_5)_3]_4$, and 26 ml. of liquefied butadiene. The mixture was then heated for 30 minutes to 85° C. to provide 10.5 g. of ethyl 2-acetyl-4,9-decadienoate. Further, when the same procedure was repeated without the addition of sodium phenoxide, 4.8 g. of ethyl 2-acetyl-4,9-decadienoate was obtained.

EXAMPLE 49

In a 100 ml. autoclave were charged 15 ml. of ethyl ether, 0.177 g. of palladium chloride, and 1.048 g. of triphenyl phosphine. After adding to the system 0.038 g. of lithium aluminum hydride, the system was stirred for 30 minutes. Thereafter, 13.0 g. of ethyl acetoacetate and 26 ml. of liquefied 1,3-butadiene were added to the system and the resulting mixture was stirred for 30 minutes at 100° C. to provide 13.5 g. of ethyl 2-acetyl-4,9-decadienoate and 9.8 g. of ethyl 2-acetyl-2-(2,7-octadienyl)-4,9-decadienoate. When 0.115 g. of sodium hydride or 0.063 g. of lithium borohydride was used in lieu of lithium aluminum hydride, similar results were obtained.

EXAMPLE 50

In a 100 ml. autoclave were charged 20 ml. of ethyl ether, 0.177 g. of palladium chloride, and 0.406 g. of tributyl phosphine. After the addition of 0.063 g. of lithium borohydride, the system was stirred for 30 minutes. Further, 15.0 g. of acetylacetone was added and the resulting mixture was stirred for 1 hour at 90° C. to provide 15.2 g. of 3-(2,7-octadienyl)-2,4-pentanedione and 12.6 g. of 3,3-bis (2,7-octadienyl)-2,4 pentanedione.

EXAMPLE 51

In a 100 ml. autoclave were charged 13 g. (0.1 mol) of ethyl acetoacetate, 0.62 g. (0.5 m. mol) of tetrakistriphenylphosphine platinum (Pt $P(C_6H_5)_3{}_4$), and 15 ml. of benzene. After replacing the air in the autoclave with 1,3-butadiene gas, 26 ml. (0.3 mol) of liquefied 1,3-butadiene was added to the system and the mixture was stirred for 8 hours at 85° C. After removing unreacted materials and benzene from the product by distillation, the residue was distilled under reduced pressure to provide 12.3 g. of ethyl 2-acetyl-4,9-decadienoate ($CH_2=CH(CH_2)_3CH=CHCH_2CH(COCH_3)COOC_2H_5$) and 3.9 g. of ethyl 2-acetyl-3-vinyl-7-octenoate ($CH_2=CH(CH_2)_3CH(CH=CH_2)CH\ (COCH_3)-COOC_2H_5$) and 17.8 g of ethyl-2-acetyl-2-(2,7-octadienyl)-4, 9-decadienoate (($CH_2=CH(CH_2)_3CH=CHCH_2)_2C(COCH_3)\ COOC_2H_5$).

EXAMPLES 52–69

The same procedure as in Example 51 was repeated using various platinum complexes shown in the following table, the results of which are shown in Table 3.

TABLE 3

| Ex. | Catalyst g(m mole) | | X—CH(Z)—Y g (mole) |
|---|---|---|---|
| 52 | $Pt[P(C_6H_5)_3]_4$, $C_2H_5ONa$ | | $CH_3COCH_2COOC_2H$ |
| | 0.62 g (0.5 m mole) | 0.48 g (7 mmol) | 13g (0.1 mole) |
| 53 | $PtCl_2[P(C_6H_5)_3]_2$, $C_6H_5ONa$ | | $CH_3COCH_2COOC_2H$ |
| | 0.40 (0.5) | 0.81 (7) | 13 (0.1) |
| 54 | $PtCl_2[P(C_6H_5)_3]_2$, P—cl—$C_6H_5OH$, | | Na $CH_3COCH_2COOC_2H_5$ |
| | 0.40 (0.5), 2.3 (18), 0.2 (9) | | 13 (0.1) |
| Ex. | Catalyst g (m mol) | | X—CH(Z)—Y g (mol.) |
| 55 | $PtCl_2[P(OC_6H_5)_3]_2$, $C_6H_5ONa$ | | $CH_3COCH_2COOC_2H_5$ |
| | 0.42 (0.5) | 0.81 (7) | 13 (0.1) |
| 56 | $Pt[P(OC_6H_5)_3]_4$, $C_6H_5ONa$ | | $CH_3COCH_2COOC_2H_5$ |
| | 0.65 (0.5), | 0.81 (7) | 13 (0.1) |
| 57 | $H_2PtCl_6\cdot 6H_2O$, $C_6H_5ONa$ | | $CH_3COCH_2COOC_2H_5$ |
| | 0.41 (0.8) | 1.16 (10) | 13 (0.1) |
| 58 | $K_2PtCl_4$, | $C_6H_5ONa$ | $CH_3COCH_2COOC_2H_5$ |
| | 0.32 (1) | 1.16 (10) | 13 (0.1) |
| 59 | $Pt(OCOCH_3)_2$, $C_6H_5ONa$ | | $CH_3COCH_2COOC_2H_5$ |
| | 0.31 (1), | 1.16 (10) | 13 (0.1) |
| 60 | $PtCl_2[P(C_6H_5)_3]_2$, $C_6H_5ONa$ | | $CH_3COCH_2COCH_3$ |
| | 0.40 (0.5), | 0.81 (7) | 11  10 (0.1) |
| 61 | $PtCl_2[P(C_6H_5)_3]_2$, t—$C_4H_9OK$ | | $CH_3COCH_2COCH_3$ |
| | 0.40 (0.5) | 0.8 (7) | 10 (0.1) |
| 62 | $Pt[P(C_6H_5)_3]_4$, $C_6H_5ONa$ | | $CH_3COCH_2COCH_3$ |
| | 0.62 (0.5) | 0.81 (7) | 10 (0.1) |
| 63 | $PTCl_2[P(OC_6H_5)_3]_2$, $C_6H_5ONa$ | | $CH_3COCH_2COCH_3$ |

| | | | |
|---|---|---|---|
| 64 | PtCl₂[P(C₆H₅)₃]₂, C₆H₅)Na | 0.42 (0.5), 0.81 (7) 0.40 (0.5), 0.81 (7) | 10 (0.1) CH₂(COOC₂H₅)₂ 16 (0.1) |
| 65 | Pt[P(OC₆H₅)₃]₄, C₆H₅ONa | 0.65 (0.5) 0.81 (7) | CH₂(COOC₂H₅)₂ 16 (0.1) |
| 66 | PtCl₂[P(C₆H₅)₃]₂ | C₆H₅ONa 0.40 (0.5) 0.81 (7) | 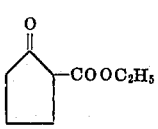 15.6 (0.1) |
| 67 | Pt[P(C₆H₅)₃]₄ | C₆H₅ONa 0.62 (0.5) 0.81 (7) | 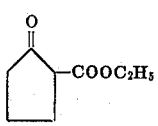 15.6 (0.1) |
| 68 | Pt[P(C₆H₅)₃]₄ | 0.62 (0.5) | 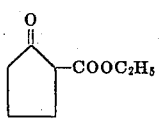 15.6 (0.1) |
| 69 | PtCl[As(C₆H₅)₃]₂ | C₆H₅ONa 0.84 (1) 1.62 (14) | 15.6 (0.1) |

TABLE 3

| Ex. | Reaction time hr | Product (g) A | B | C |
|---|---|---|---|---|
| 52 | 5 | 4.3 g | — g | 15.8 g |
| 53 | 5 | 3.9 | 3.8 | 21.7 |
| 54 | 8 | 8.3 | — | 19.5 |
| 55 | 8 | 4.9 | — | 19.2 |
| 56 | 8 | 6.2 | — | 15.7 |
| 57 | 10 | 13.9 | — | — |
| 58 | 10 | 12.3 | — | — |
| 59 | 10 | 7.3 | — | — |
| 60 | 8 | 3.2 | 2.6 | 17.2 |
| 61 | 8 | 5.2 | 1.2 | 16.8 |
| 62 | 10 | — | — | 11.3 |
| 63 | 15 | 10.8 | — | — |
| 64 | 5 | 20.3 | — | 5.2 |
| 65 | 5 | 15.3 | — | 4.1 |
| 66 | 5 | 24.6 | — | — |
| 67 | 5 | 21.0 | — | — |
| 68 | 5 | 10.8 | — | — |
| 69 | 10 | 22.8 | — | — |

Reaction conditions: 26 ml (0.3 mol) of liquefied 1,3-butadiene 15 ml of benzene
Reaction temperature: 120°C in Example 56 130°C in Examples 59, 60 and 61, and 85° C in other examples.

Product:
A: 
B: 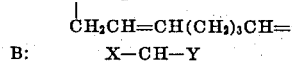
C: 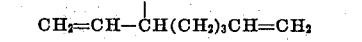

(wherein X, Y and Z are as shown before)

In a 100 ml. autoclave were charged 13 g. (0.1 mol) of ethyl acetoacetate, 0.42 g. (0.5 m. mol) of PtCl₂ P(C₆H₅)₃ ₂, 0.81 g. (7 m. mols) of sodium phenoxide, 15 ml. of benzene, and 20.4 g. (0.3 mol) of isoprene. The system was reacted for 130° C. at 10 hours to provide 19.3 g. of ethyl 2-acetyl-4,9-dimethyl-4,9-decadienoate (CH₂ = C(CH₃)(CH₂)₃CH = C(CH₃)CH₂— CH(COCH₃)COOC₂H₅) and 5.8 g. of ethyl 2-acetyl-2-(2,7-dimethyl-2,7-octadienyl)-4,9-dimethyl-4,9-decadienoate (CH₂ = C(CH₃)(CH₂)₃—CH = C(CH₃)CH₂)₂C (COCH₃)COOC₂H₅).

EXAMPLE 71

In a 100 ml. autoclave were charged 0.12 g. (0.5 m. mol) of Pd(NH₃)₂no₂)₂, 0.58 g. (5 m. mols) OF C₆H₅ONa, 13 g. (0.1 mol) of CH₃COCH₂COOC₂H₅, and 26 ml. of liquefied 1,3-butadiene followed by stirring for 2 hours at 85° C. After removing unreacted materials by distillation, the residual product was distilled under reduced pressure to provide 16.5 g. of CH₃COCH(COOC₂H₅)—CH₂CH = CH(CH₂)₃—CH = CH₂ and 7.4 g. of CH₃COC(COOC₂H₅)(CH₂CH = CH(CH₂)₃ — CH = CH₂)₂.

EXAMPLES 72-90

The same procedure as in Example 71 was repeated while using 0.5 m. mol of a palladium complex shown in the following table instead of Pd(NH₃)₂(NO₂)₂, the results of which are shown in Table 4.

TABLE 4

| Ex. No. | Palladium Complex | CH₃COCH (COOC₂H₅) —CH₂ = CH(CH₂)₃ CH = CH₂(g) | CH₃COC (COOC₂H₅) (CH₂CH = CH(CH 2)₃ CH = CH₂)₂(g) |
|---|---|---|---|
| 72 | trans-[Pd (NH₃)₂Cl₂] | 19.4 | 1.8 |
| 73 | [Pd (NH₃)₄] (Cl₂°H₂O | 17.8 | 2.9 |
| 74 | [Pd (Py)₂Cl₂] | 16.4 | 1.4 |
| 75 | [Pd (en) Cl₂] | 15.0 | 0.5 |
| 76 | [Pd(NH₃)₄] [PdCl₄] | 18.7 | 2.3 |
| 77 | trans-[Pd (NH₃)₂Br₂] | 19.8 | 2.4 |
| 78 | [Pd(Py)₂I₂] | 15.3 | 3.9 |
| 79 | [Pd(en)₂Cl₂ | 13.4 | 0.3 |
| 80 | [Pd(en)₂I₂ | 13.9 | 0.5 |
| 81 | [Pd (dpy)Cl₂] | 10.3 | 0.2 |
| 82 | [Pd(NH₃)₂ (C₂O₄)] | 11.3 | 0.7 |
| 83 | [Pd(dpy) (CNS)₂] | 9.1 | — |
| 84 | [Pd(CH₃NH₂)₂ Cl₂] | 17.2 | 3.1 |
| 85 | [Pd((C₂H₅)₂ NH)₂ Br]₂ | 16.3 | 2.7 |
| 86 | [Pd(C₆H₅NH₂)₂ Cl₂] | 15.4 | 1.2 |
| 87 | [Pd(C₅H₁₀NH)₂ Cl₂] | 16.7 | 2.9 |
| 88 | [Pd(CH₃C(NOH) (NOH)CH₃)₂ | 9.3 | — |
| 89 | (NH₄)₂PdCl₄ | 18.3 | 2.8 |
| 90 | (NH₄)₂PdBr₄ | 18.1 | 3.2 |

EXAMPLE 91

In a 100 ml. autoclave were charged 0.12 g. (0.5 m. mol) of Pd(NH₃)₂NO₂)₂, 0.58 g. (5 m. mols) of C₆H₅ONa 10 g. (0.1 mol) of CH₃COCH₂COCH₃, and 26 ml. of liquefied 1,3-butadiene followed by stirring for 5 hours at 120°-130° C. After removing unreacted materials by distillation, the residual product was distilled under reduced pressure to provide 10.8 g. of (CH₃CO)₂CHCH₂CH = CH—(CH₂)₃ CH = CH₂ and 2.3 g. of (CH₃CO)₂C(CH₂CH = CH(CH₂)₃CH = CH₂)₂.

EXAMPLE 92

In a 100 ml. autoclave were charged 0.106 g. (0.5 m. mol) of trans-[Pd(NH₃)₂Cl₂], 0.58 g. (5 m. mols) of C₆H₅ONa, 16 g. (0.1 mol) of CH₂(COOC₂H₅)₂, and 26 ml. (0.3 mol) of liquefied 1,3-butadiene followed by stirring for 2 hours at 85° C. After removing unreacted materials, the residue was subjected to a distillation under reduced pressure to provide 16.9 g. of (COOC₂H₅)₂CHCH₂CH = CH(CH₂)₃ CH = CH₂ and 3.1 g. of (COOC₂H₅)₂C—(CH₂CH = CH(CH₂)₃CH = CH₂)₂.

EXAMPLES 93-102

The same procedure as in Example 92 was repeated while employing in lieu of $C_6H_5ONa$ 0.5 m. atom of the alkali metal or 0.5 m. mol of the basic alkali metal salt as shown in the following table, the results of which are shown in Table 5.

TABLE 5

| Ex. No. | Alkali metal or basic alkil metal salt | $(COOC_2H_5)_2CH$—$CH_2CH = CH(CH_2)_3$ $CH = CH_2(g)$ | $(COOC_2H_5)_2C(CH_2 CH = CH(CH_2)_3 CH = CH_2)_2(g)$ |
|---|---|---|---|
| 93 | Na | 15.3 | 2.1 |
| 94 | K | 16.0 | 2.4 |
| 95 | NaH | 16.3 | 2.9 |
| 96 | $CH_3ONa$ | 17.1 | 2.7 |
| 97 | $Na_2CO_3$ | 13.4 | 0.8 |
| 98 | $p-NO_2C_6H_4OK$ | 17.3 | 3.2 |
| 99 | $C_6H_5OLi$ | 15.3 | 1.4 |
| 100 | $C_2H_5ORb$ | 12.5 | 0.8 |
| 101 | NaCH(CN) | 1.1 | |
| 102 | $CO_2C_2H_5$ | 14.8 | 1.3 |
| | $C_6H_5OCs$ | 13.7 | |

EXAMPLE 103

In a 100 ml. autoclave were charged 0.16 g. (0.5 m. mol) of $[Pt(NH_3)B4]C_2$, 0.58 g. (5 m. mols) of $C_6H_5ONa$, 11.4 g. (0.1 mol) of $CH_3COCH_2COOCH_3$, and 26 ml. (0.3 mol) of 1,3-butadiene followed by stirring for 20 hours at 132°–140° C. After removing unreacted materials by distillation, the residue was distilled under reduced pressure to provide 10.2 g. of $CH_3CO$—$CH(COOCH_3)CH_2CH = CH(CH_3)_3CH = CH_2$ and 1.1 g. of $(CH_3CO)C(COOCH_3)$—$(CH_2CH = CH(CH_2)_3CH = CH_2)_2$.

EXAMPLES 104-114

The same procedure as in Example 103 was repeated while using 0.5 m. mol of each of the platinum complexes shown in the following table in lieu of $[Pt(NH_3)_4]C_2$, the results of which are shown in Table 6.

TABLE 6

| Ex. No. | Platinum Complex | $(CH_3CO)CH$ $(COOCH_3)$—$CH_2$ $CH = CH(CH_2)_3$ $CH = CH_2(g)$ | $(CH_3CO)C(COOCH_3)$ $(CH_2CH = CH(CH_2)_3 CH = CH_2)_2(g)$ |
|---|---|---|---|
| 104 | $[Pt(NH_3)_4][PtCl_4]$ | | |
| 105 | $[Pt(NH_3)_4]Cl_2 \cdot H_2O$ | 9.7 | 1.3 |
| 106 | trans-$[Pt(NH_3)_2Cl_2]$ | 10.9 | 2.4 |
| 107 | trans-$[Pt(NH_3)_2Br_2]$ | 11.3 | 3.2 |
| 108 | trans-$[Pt(NH_3)_2I_2]$ | 10.8 | 2.8 |
| 109 | cis-$[Pt(NH_3)_2Cl_2]$ | 11.1 | 1.8 |
| 110 | $[Pt(NH_3)(NO_2)_2]$ | 10.5 | 2.1 |
| 111 | | 9.2 | 1.4 |
| 112 | $[Pt(en)Br_2]$ | 6.3 | 0.2 |
| 113 | $[Pt(Py)_2Cl_2]$ | 8.6 | 0.9 |
| 114 | $[Pt(C_6H_5NH_2)_2Cl_2]$ | 7.1 | 1.1 |
| | $(NH_4)_2[PtCl_4]$ | 10.2 | 3.5 |

EXAMPLE 115

In a 100 ml. autoclave were charged 0.12 g. (0.5 m. mol) of $Pd(NHhd 3)_2(NO_2)_2$, 0.58 g. (5 m. mols) of $C_6H_5ONa$, and 13 g. (0.1 mol) of $CH_3COCH_2COOC_2H_5$ and the air in the autoclave was replaced with an arogon gas. Thereafter, 20.4 g. (0.3 mol) of isoprene was added to the system and the system was stirred for 10 hours at 120°–130° C. After removing unreacted materials from the reaction product, the residue was distilled under reduced pressure to provide 10.2 g. of $(CH_3CO)CH(COOC_2H_5)CH_2C$—$(CH_3) = CH(CH_2)_3C(CH_3 = CH_2$ and 2.2 g. of $(CH_3CO)C(COOC_2H_5)(CH_2C$—$(CH_3)) = CH(CH_2)_3C(CH_3) = CH_2)_2$.

EXAMPLE 116

The same procedure as in Example 115 was repeated while employign 20.4 g. of 1,3-pentadiene instead of isoprene to provide 7.3 g. of $(CH_3CO)CH(COOC_2H_5)CH(CH_3)CH = CHCH_2CH(CH_3)$—$CH_2CH = CH_3$.

EXAMPLE 117

The same procedure was repeated as in Example 115 while using 24.6 g. of 2,3-dimethylbutadiene in lieu of isoprene to provide 2.3 g. of $(CH_3CO)CH(COOC_2H_5)CH_2C(CH_3) = C(CH_3)$—$CH_2CH_2CH(CH_3)C(CH_3) = CH_2$.

EXAMPLE 118

In a 100 ml. autoclave were charged 0.28 g. (1 m mol) of $(NH_4)_2bPdCl_4$, 11.6 g. (10 m. mols) of $C_6H_5ONa$, and 11.4 g. (0.1 mol) of $CH_3CH(COCH_3)_2$ and the air in the autoclave was replaced with a 1,3-butadiene gas. Then, 26 ml. (0.3 mol) of liquefied 1,3-butadiene was added to the system followed by stirring for 10 hours at 120°–130° C. After removing unreacted materials from the reaction product, the residue was distilled under reduced pressure to provide 13.1 g. of $(CH_3CO)_2C(CH_3)CH_2$—$CH = CH(CH_2)_3CH = CH_2$ (having a boiling point of 132°–133° C.) /4 mm. Hg.

EXAMPLE 119

In a 100 ml. autoclave were charge 6.3 g. (0.05 mol) of α-formylcyclohexanone, 0.115 g. (0.1 m. mol) of $Pd[P(C_6H_5)_3]_4$, 10 ml. of benzene, and 13 ml. liquefied butadiene followed by stirring for 1 hour at 85° C. The reaction liquid thus obtained was distilled under reduced pressure to provide 9.8 g. of α-(2,7-octadienyl)-α-formylcyclohexanone (having a boiling point of 158° C./45 mm. Hg. $n_D^{25}$ of 1.4880). The product was confirmed by elementary analysis infrared absorption spectra and NMR spectra. The amount of high boiling residues was 0.6 g.

EXAMPLE 120

In a 100 ml. autoclave were charged 25.2 g. (0.2 mol) of α-formylcyclohexanone, 0.070 g. (0.1 m. mol) of $PdCl_2[P(C_6H_5)_3a[_2$, 0.218 g. (2 m. mols) of sodium phenoxide and 51 ml. (ca. 0.6 mol) of liquefied butadiene followed by stirring for 40 minutes at 85° C. to provide 40.8 g. of α-(2,7-octadienyl)-α-formylcyclohexanone. The amount of high boiling residues was 2.9 g. The same procedure as above was repeated while using 40.8 g. of isoprene instead of butadiene to provide 21.3 g. of α-2,7-dimethyl-2,7-octadienyl)-α-formylcyclohexanone.

EXAMPLE 121

In a 100 ml. autoclave were charged 10.0 g. (0.1 mol) of 3-formyl-2-butanone, 0.053 g. (0.1 m. mol) of $PdI_2[P(C_4H_9)_3]_2$, 0.122 g. (1 m. mol) of potassium phenoxide, and 26 ml. of liquefied 1,3-butadiene followed by stirring for 1 hour at 85° C. to provide 5.5 g. of 3-(2,7-octadienyl)-3-formyl-2-butanone (having a boiling point of 121° C./4.5 mm. Hg. $n_D^{25}$ of 1.4672). The amount of high boiling residues was 0.4 g.

EXAMPLE 122

In a 100 ml. autoclave were charged 18.2 g. (0.1 mol) of α-formylcyclododecanone, 0.070 g. (0.1 m. mol) of $PdCl_2[P(C_6H_5)_3a[_2$, 0.054 g. (1 m. mol) of sodium methoxide and 26 ml. of liquefied 1,3-butadiene followed by stirring for 1 hour at 85° C. to provide 26.1 g. of α-(2,7-octadienyl)-α-formylcyclododecanone.

EXAMPLE 123

In a 100 ml. autoclave were charged 6.5 g. (0.05 mol) of ethyl α-formylpropionate, 0.035 g. (0.05 m. mol) of PdCl₂[P(CH₃)₃]₂, 0.054 g. (1 m. mol) of sodium methoxide and 13 ml. of liquefied 1,3-butadiene followed by stirring for 1½ hours at 85° C. to provide 7.0 g. of ethyl α-(2,7-octadienyl)-α-formylpropionate (having a boiling point of 119° C. /3.5 mm. Hg., $n_D^{25}$ of 1.4551). The amount of high boiling residues was 0.9 g. The same procedure as above was repeated while using butyl α-formylpropionate instead of ethyl α-formylpropionate to provide butyl α-(2,7-octadienyl)-α-formylpropionate.

EXAMPLE 124

In a 100 ml. autoclave were charged 19.2 g. ethyl -formylphenylacetate, 0.62 g. of Pd[P(C₆H₅)₃]₄, 10 ml. of benzene and 26 ml. of liquefied 1,3-butadiene followed by stirring for 1 hour at 100° C. to provide 23.1 g. of ethyl α-(2,7-octadienyl)-α-formylphenyl-acetate (having a boiling point of 158° C./0.1 mm. Hg, $n_D^{25}$ of 1.5075). The amount of high boiling residue was 1.0 g.

EXAMPLE 125

In a 100 ml. autoclave were charged 19.2 g. (0.1 mol) of ethyl formylphenylacetate, 0.212 g. (2 m. mol) of sodium phenoxide, 0.140 g. (0.2 m. mol) of PdCl₂[P(C₆H₅)₃]₂ and 26 ml. of liquefied 1,3-butadiene followed by stirring for 10 minutes at 85° C. to provide 26.9 g. of ethyl α-(2,7-octadienyl)-α-formylphenylacetate. The amount of high boiling residue was 1.5 g.

EXAMPLE 126

In a 100 ml. autoclave were charged 6.6 g. (0.1 mol) of malononitrile (NC—CH₂—CN), 0.35 g. (0.5 m. mol) of dichlorobis(triphenylphosphine) palladium (PdCl₂[P(C₆H₅)₃]₂), 0.58 g. (5 m. mols) of sodium phenoxide, 15 ml. of benzene and 26 ml. (0.3 mol) of liquefied 1,3-butadiene followed by stirring for 2 hours at 85° C. After removing unreacted materials and benzene by distillation, the residue was distilled under reduced pressure to provide 2.0 g. of 2,7-octadienyl-malononitrile (CH₂ = CH(CH₂)₃CH = CHCH₂CH(CN)₂) (having a boiling point of 115° C./2 mm. Hg., $n_D^{25}$ pf 1.4626) and 9.5 g. of bis(2,7-octadienyl) malononitrile [(CH₂ = CH(CH₂)₃CH = CHCH₂)₂C(CN)₂] (having a boiling point of from 174° to 176° C./ 4 mm. Hg., $n_D^{25}$ of 1.4800).

EXAMPLES 127-145

The same procedure as in Example 126 was repeated while using various palladium or platinum compounds, shown in the following table instead of PdCl₂[P(C₆H₅)₃]₂, the results of which are shown in Table 7.

TABLE 7

| Example No. | Palladium or platinum compounds | Products (g.) | |
|---|---|---|---|
| | | (¹) | (²) |
| 127 | PdCl₂[P(OC₆H₅)₃]₂ | 1.6 | 10.5 |
| 128 | PdCl₂ | 5.8 | 3.2 |
| 129 | PdCl₂[PCl₃]₂ | 3.4 | 8.2 |
| 130 | PdCl₂[As(C₆H₅)₃]₂ | 2.1 | 9.6 |
| 131 | Pd[P(C₆H₅)₃]₂ benzoquinone | 2.9 | 9.7 |
| 132 | Pd[P(C₆H₅)₃]₂ CH—COOMe ‖ CHCOOMe | 3.4 | 10.2 |
| 133 | Pd[P(C₆H₅)₃]₂ CH—C=O ‖ \ CH—C—O ‖ O | 2.2 | 8.5 |
| 134 | Pd(π-C₃H₅)₂ | 4.9 | 3.8 |
| 135 | PdCl₂[C₆H₅—CH=CH₂]₂ | 2.8 | 5.1 |
| 136 | PdCl₂(CH₂=CH—CH=CH₂) | 1.8 | 7.2 |
| 137 | Na₂PtCl₆6H₂O | 1.9 | 2.3 |
| 138 | [Pt(P(C₂H₅)₃)₄][PtCl₄] | 4.3 | 5.4 |
| 139 | [Pt(P(OC₂H₅)₃)₄]Cl₂ | 6.2 | 2.8 |
| 140 | Pt[P(C₆H₅)₃]₂· benzoquinone | 4.8 | 5.4 |
| 141 | Pt[P(C₆H₅)₃]₂· CH—COOMe ‖ CH—COOMe | 4.8 | 5.4 |
| 142 | PtCl(π-C₃H₅)P(C₆H₅)₃ | 5.1 | 4.8 |
| 143 | Pt(π-C₃H₅)₂ | 1.9 | 2.5 |
| 144 | KPtCl₃(CH₂=CH₂) | 3.2 | 1.6 |
| 145 | PtCl₂[P(OC₆H₅)₃]₂ | 4.8 | 5.8 |

¹ (CH₂=CH(CH₂)₃CH=CHCH₂CH(CN)₂.
² (CH₂=CH(CH₂)₃CH=CHCH₂)₂C(CN)₂.

EXAMPLE 146

In a 100 ml. autoclave were charged 5.7 g. (0.05 mol) of ethyl cyanoacetate (NC—CH₂COOC₂H₅), 0.12 g. (0.1 mol) of Pd[P(C₆H₅)₃]₄, 0.12 g. (1 m. mol) of sodium phenoxide, 15 ml. of benzene and 13 ml. (0.15 mol) of liquefied 1,3-butadiene followed by stirring for 2 hours at 85° C. After removing unreacted materials and benzene by distillation, the residue was distilled under reduced pressure to provide 5.2 g. of ethyl 2-cyan-4,9-decadienoate [(CH₂= CH(CH₂)₃CH = CHCH₂CH(CN)COOC₂H₅ (having a boiling point of 120°–120.5°C./ 2 mm. Hg. $n_D^{25}$ of 1.4553), 1.8 g. of ethyl 2-cyan-3-vinyl-7-octenate (CH₂ = CH(CH₂)₃CH(CH = CH₂)CH(CN)COOC₂H₅ (having a boiling point of from 115°–116° C./ 2 mm. Hg. $n_D^{25}$ of 1.4535), and 8.9 g. of ethyl 2-cyan-2-(2,7-octadienyl)-4,9-decadienoate (having a boiling point of 161°–162° C./ 2 mm. Hg. $n_D^{25}$ of 1.4747).

EXAMPLE 147

In a 100 ml. autoclave were charged 11.3 g. (0.1 mol) of ethyl cyanoacetate, 0.18 g. (0.25 m. mol) of PdCl₂[P(C₆H₅)₃]₂, 0.29 g. (2.5 m. mol) of sodium phenoxide, 15 ml. of benzene and 26 ml. (0.3 mol) of liquefied 1,3-butadiene followed by stirring for 1 hour at 85° C. to provide 5.0 g. of ethyl 2-cyan-4,9-decadienoate, 1.2 g. of ethyl 2-cyan-3-vinyl-7-octenate and 19.8 g. of ethyl 2-cyan-2-(2, 7-octadienyl)-4,9-decadienoate.

EXAMPLES 148-156

The same procedure as above was repeated while using various alkali metal salts (2.5 m. mol) under the same conditions as in Example 147 only instead of sodium phenoxide, the results of which are shown in Table 8.

TABLE 8

| Example No. | Alkali metal salts | Products | | |
|---|---|---|---|---|
| | | (¹) | (²) | (³) |
| 148 | NaH | 3.2 | 0.2 | 13.4 |
| 149 | P—Cl—C₆H₄ONa | 4.3 | 1.8 | 20.3 |
| 150 | P—NO₂—C₆H₄OK | 8.2 | 0.4 | 13.2 |
| 151 | Na₂CO₃ | 7.3 | 1.1 | 15.4 |
| 152 | P—C₆H₅—C₆H₄—ONa | 3.5 | 2.4 | 18.2 |
| 153 | C₆H₅OLi | 1.8 | 0.4 | 10.3 |
| 154 | C₂H₅ORb | 4.2 | 0.1 | 5.8 |
| 155 | CH₂=CHCH₂ONa | 9.3 | 1.1 | 11.2 |
| 156 | NaCH(CN)CO₂C₂H₅ | 5.8 | 3.2 | 19.1 |

¹ NC—CH—COOC₂H₅
   |
   CH₂CH=CHCH₂CH₂CH=CH₂

² NC—CH—COOC₂H₅
   |
   CH₂=CH—CH—CH₂CH₂CH₂CH=CH₂

³ (CH₂=CHCH₂CH₂CH₂CH=CHCH₂)₂C(CN)COOC₂H₅.

EXAMPLE 157

In a 100 ml. autoclave were charged 5.7 g. (0.05 mol) of ethyl cyanoacetate, 0.20 g. (0.25 mol) of dichlorobis(triphenylphosphine)platinum (PtCl₂[P(C₆H₅)₃]₂, 0.18 g. (2.5 m. mols) of sodium phenoxide, 15 ml. of benzene and 13 ml. (0.15 mol) of liquefied 1,3-butadiene followed by stirring at 85° C. for 15 hours to provide 2.3 g. of ethyl 2-cyan-4, 9-decadienoate and 4.2 g. of ethyl 2-cyan-2-(2,7-octadienyl)-4,9-decadienoate.

EXAMPLES 158–168

The reaction of 1,3-butadiene and active hydrogen compounds shown in the following table was conducted by the same procedure as in Example 157 using the catalyst shown in the table, the results of which are also shown therein.

TABLE 9

| Ex. No. | Catalysts g(mol) | X CH(Z) Y g(mol) | Liquefied 1,3-butadiene ml.(mol) |
|---|---|---|---|
| 158 | Pd[P($C_6H_5$)$_3$]$_4$,$C_6H_5$ONa 0.29g(0.25mmol), 0.29g (2.5mmols), | $CH_3$CH(CN)COCH$_3$ 3.8g(0.038mol) | 10 ml. (0.12) |
| 159 | PdCl$_2$[P($C_6H_5$)$_3$]$_2$$C_6H_5$ONa 0.18(0.25), 0.29(2.5) | NCCH$_2$CONH$_2$ 4.2 (0.05) | 9 (0.1) |
| 160 | PdCl$_2$[P($C_6H_5$)$_3$]$_2$$C_6H_5$ONa 0.18(0.25), 0.29(2.5) | $C_6H_5$COCH$_2$CN 7.3(0.05) | 9 (0.1) |
| 161 | PdCl$_2$[P($C_6H_5$)$_3$]$_2$$C_6H_5$ONa 0.18(0.25) 0.29(2.5) | NC—CH(p—CH$_3$$C_6H_4$)COCH$_3$ 8.7(0.05) | 13 (0.15) |
| 162 | Pd[P($C_6H_5$)$_3$]$_4$ CH$_3$ONa 0.29(0.25),0.54(10) | NCCH($C_8H_{13}$)COC$_5H_5$ 12.2 (0.25) | 13 (0.15) |
| 163 | PdCl$_2$[P($C_6H_5$)$_3$]$_6$ $C_6H_5$ONa 0.18(0.25), 0.29(5) 2.5 | O ∥ ⟨benzene⟩—CN 6.2(0.05) | 13 (0.15) |
| 164 | PdCl$_2$[P($C_6H_5$)$_3$]$_{22}$ CHONa 0.18(0.25), 0.27(5) | $C_6H_5$CH(CN)COCH$_3$ 8.0(0.05) | 13 (0.15) |
| 165 | PdCl$_2$[P($C_6H_5$)$_3$]$_r$$C_6H_5$ONa 0.11(0.16), 0.19(1.6) | $C_6H_5$COCH$_2$NO$_2$ 2.6g(0.016) | 9 (0.1) |
| 166 | Pd[P($C_6H_5$)$_3$]$_4$$C_6H_5$ONa 0.29(0.25), 0.29(2.5) | NO$_2$CH(CH$_3$)NO$_2$ 5.3(0.05) | 13 (0.15) |
| 167 | PdCl$_2$[P($C_6H_5$)$_3$]$_6$·CH$_3$ONa 0.18(0.25), 0.14(2.5) | NC—CH$_2$—NO$_2$ 4.3(0.05) | 13 (0.15) |
| 168 | PdCl$_2$[P($C_6H_5$)$_3$]$_8$ $C_6H_5$ONa 0.21(0.29), 0.34(2.9) | O ∥ ⟨benzene⟩—NO$_2$ 13.0(0.91) | 26 (0.3) |

TABLE 9

| Ex. No. | Re-action time hr. | Products g A (boiling point,$n_D^{25}$) | B (boiling point,$n_D^{25}$) |
|---|---|---|---|
| 158 | 15 | 5.1 g 111-2° C/4mm Hg;1.4652 | — |
| 159 | 15 | 3.2 122-5/0.05 | 6.8 g 165-7°C/0.05mmHg |
| 160 | 1 | 8.9 134-6/10$^{-4}$,1.5293 | 2.3 156-8/10$^{-4}$,1.5210 |
| 161 | 20 | 8.1 182-185/10$^{-3}$ | — |
| 162 | 20 | 16.29 156-8/10$^{-4}$,1.5210 | — |
| 163 | 5 | 9.2 153-5/10$^{-4}$ | — |
| 164 | 1 | 10.3 163-6/10$^{-4}$ | — |
| 165 | 20 | 1.2 113-4/10$^{-4}$ | 2.1 162-5/10$^{-4}$ |
| 167 | 15 | 3.2 123-5/3 | 5.3 154-7/10$^{-4}$ |
| 166 | 5 | 8.4 134-5/3 | — |
| 168 | 10 | 15.3 138-142/5×10$^{-1}$,4821 | — |

Product: A:
$$\begin{array}{c} X-CZ-Y \\ | \\ CH_2CH=CH(CH_2)_3CH=CH_2 \end{array}$$

B:
$$\begin{array}{c} CH_2CH=CH(CH_2)_3CH=CH_2 \\ | \\ X-C-Y \\ | \\ CH_2CH=CH(CH_2)_3CH=CH_2 \end{array}$$

(wherein X, Y and Z are as shown in the Table 9)

Example 169

In a 100 ml. autoclave were charged 6.7 g. (0.05 mol) of ethyl nitroacetate (NO$_2$CH$_2$COOC$_2$H$_5$), 0.18 g. (0.25 m. mol) of PdCl$_2$[P($C_6H_5$)$_3$]$_2$, 0.29 g. (2.5 m. mols) of sodium phenoxide, 15 ml. of benzene and 13 ml. (0.15 mol) of liquefied 1,3-butadiene followed by stirring for 10 hours at 85° C. After removing unreacted materials and benzene by distillation, the residue was distilled under reduced pressure to provide 5.2 g. of ethyl 2-nitro-4,9-decadienoate [CH$_2$ = CH(CH$_2$)$_3$CH = CHCH$_2$CH(NO$_2$)COOC$_2$H$_5$] (having a boiling point of 110°–112° C./ 2 mm. Hg. $n_D^{25}$ of 1.4619), 6.1 g. of ethyl 2-nitro-2-(2,7-octadienyl)-4,9-decadienoate (having a boiling point of 154°–156° C./ 2 mm. Hg. $n_D^{25}$ of 1.4820).

EXAMPLES 170–179

The same procedure as above was repeated while using 0.25 m. mol of palladium or platinum compounds under the same conditions as in Example 169 instead of PdCl$_2$[P($C_6H_5$)$_3$]$_2$, the results of which are shown in Table 10.

TABLE 10

| Example No. | Palladium or platinum compounds | Products (g.) (1) | (2) |
|---|---|---|---|
| 170 | Pd[P($C_6H_5$)$_3$]$_4$ | 7.4 | 1.3 |
| 171 | Pd($\pi$-C$_3$H$_5$)$_2$ | 2.3 | 1.3 |
| 172 | ⟨cyclooctadiene⟩PdCl$_2$ | 5.8 | 0.2 |
| 173 | PdBr$_2$[P(C$_2$H$_5$)$_3$]$_2$ | 8.1 | 2.3 |
| 174 | Pd(NO$_3$)$_2$ | 1.8 | 0.8 |
| 175 | ⟨benzoquinone⟩Pd[P($C_6H_5$)$_3$]$_2$ | 4.3 | 4.9 |
| 176 | PtCl$_2$[P($C_6H_5$)$_3$]$_2$ | 3.4 | 2.1 |
| 177 | Pt[Pt($C_6H_5$)$_3$]$_4$ | 4.2 | 0.3 |
| 178 | Pt[P(OC$_6$H$_5$)$_3$]$_4$ | 3.6 | 1.9 |
| 179 | PtC$_2$[P($C_6H_5$)$_3$]$_2$ | 2.3 | 2.4 |

[1] CH$_2$=CH(CH$_2$)$_3$CH=CHCH$_2$CH(NO$_2$)COOC$_2$H$_5$.
[2] (CH$_2$=CH(CH$_2$)$_3$CH=CHCH$_2$)$_2$C(NO$_2$)COOC$_2$H$_5$.

EXAMPLE 180

In a 100 ml. autoclave the air in which had been replaced with argon gas were charged 5.7 g. (0.05 mol) of ethyl cyananoacetate, 0.18 g. (0.25 m. mols) of PdCl$_2$[P($C_6H_5$)$_3$]$_2$, 0.29 g. (2.5 m. mols) of sodium phenoxide, 15 ml. of benzene and 10.2 g. (0.15 mol) of isoprene followed by stirring for 15 hours for 85° C. After removing unreacted materials and benzene by distillation, the residue was distilled under reduced pressure to provide 5.8 g. of ethyl 2-cyan-4,9-dimethyl-4,9-decadienoate [CH$_2$ = C(CH$_3$)(CH$_2$)$_3$CH = C(CH$_3$)CH$_2$ CH(CN)COOC$_2$H$_5$] (having a boiling point of from 125°–127° C./ 2 mm. Hg.) and 8.2 g. of ethyl 2-cyan-2-(2,7-dimethyl-2,7-octadienyl)-4.9-dimethyl-4,9-decadienoate [CH$_2$ = C(CH$_3$)(CH$_2$)$_3$CH = C(CH$_3$) CH$_2$)$_2$C(CN)COOC$_2$H$_5$] (having a boiling point of 172°–174° C./ 2 mm. Hg.).

EXAMPLE 181

The same procedure as in Example 180 was repeated while using 0.29 g. (0.25 mol) of Pd [P($C_6H_5$)$_3$]$_4$ instead of PdCl$_2$ [P($C_6$H)$_3$]$_2$ to provide 4.8 g. of ethyl 2-cyan-4, 9-dimethyl-4,9-decadienoate and 9.4 g. of ethyl 2-cyan-2-(2,7-dimethyl-2,7-octadienyl)-4,9-dimethyl-4,9-decadienoate.

EXAMPLE 182

In a 100 ml. autoclave the air in which had been replaced with argon gas were charged 6.6 g. (0.1 mol) of malononitrile, 0.29 g. (0.25 m. mols) of Pd[P(C₆H₅)₃]₄, 0.29 g. (2.5 m. mols) of sodium phenoxide, 20.4 g. (0.3 mol) of isoprene and 15 ml. of benzene followed by stirring for 5 hours at 85° C. The reaction liquid thus obtained and benzene were distilled under reduced pressure to provide 3.1 g. of 2,7-dimethyl-2,7-octadienylmalononitrile CH₂ = C(CH₃)(CH₂)₃CH = C(CH₃)CH₂CH(CN)₂ (having a boiling point of 127° C./ 2 mm. Hg.), and 10.3 g. of bis(2,7-octadienyl)malononitrile (CH₂ = C(CH₃)(CH₂)₃CH C(CH 3)CH₂)₂C(CN)₂ (having a boiling point of 180°-182° C. /2 mm. Hg.).

EXAMPLE 183

The same procedure as above was repeated while using 6.7 g. (0.05 mol) of ethyl nitroacetate with isoprene instead of ethyl cyanacetate as in Example 180 to provide 6.3 g. of ethyl 2-nitro-4,9-dimethyl-4,9-decadienate (CH₂ = C(CH₃)(CH₂)₃CH = C(CH₂)CH(NO₂)COOC₂H₅) (having a boiling point of 124°-125° C./ 2 mm. Hg.) and 3.4 g. of ethyl 2-nitro-2-(2,7-dimethyl-2,7-octadienyl)-4,9-dimethyl-4.9-decadienate (CH₂= C(CH₃)(CH₂)₃ CH = C(CH₃)CH₂)₂C(NO₂)COOC₂H₅ (having a boiling point of 163°-165° C./ 2 mm. Hg.).

EXAMPLE 184

In a 100 ml. autoclave were charged 14.8 g. (0.05 mol) of C₆H₅SO₂CH₂SO₂C₆H₅, 0.35 g. (0.5 m. mol) of PdCl₂[P(C₆H₅)₃]₂, 0.58 g. (5 m. mols) of C₆H₅ONa and 13 ml. (0.15 mol) of liquefied 1,3-butadiene followed by stirring for 20 hours at 120°-130° C. After removing benzene by distillation, the product was purified by a column chromatography to provide 5.4 g. of (C₆H₅SO₂)₂CH—CH₂CH = CHCH₂CH₂CH₂CH = CH₂ (having a boiling point of 107°-109° C./ 10⁻⁴ mm. Hg.).

EXAMPLE 185

In a 100 ml. autoclave were charged 9.0 g. (0.05 mol) of C₆H₅SOCH₂CN, 0.35 g. (0.5 m. mol) of PdCl₂[P(C₆H₅)₃]₂, 0.27 g. (5 m. mol) of CH₃ONa, 15 ml. of toluene and 13 ml. (0.15 mol) of liquefied 1,3-butadiene followed by stirring for 10 hours at 140°-150° C. After removing toluene by distillation, the product was purified by column chromatography to provide 4.3 g. of C₆H₅SO₂—CH(CN)CH₂CH = CHCH₂CH₂bCH = CH₂.

EXAMPLE 186

In a 100 ml. autoclave were charged 11.4 g. (0.05 mol) of C₆H₅SO₂CH₂COOC₂H₅, 0.18 g. (0.25 m. mol) of PdCl₂[P(C₆H₅)₃]₂, 0.29 g. (2.5 m. mols) of C₆H₅ONa, 15 ml. of benzene and 13 ml. (0.15 mol) of liquefied 1,3-butadiene followed by stirring for 20 hours at 85° C. After removing benzene by distillation, the product was distilled under reduced pressure to provide 15.8 g. of C₆H₅SO₂CH(COOC₂H₅) CH₂CH = CHCH₂CH₂CH₂CH CH₂ (having a boiling point of 156°-157° C./ 10⁻⁴ mm. Hg., $n_D^{25}$ of 1.5176).

EXAMPLES 187-234

The same procedure as in Example 186 was repeated while using 0.25 m. mol of palladium shown in the following table instead of PdCl₂[P(C₆H₅)₃]₂, the results of which are shown in Table 11.

TABLE 11

| Ex. No. | Palladium Compounds | Products (g) |
|---|---|---|
| | C₆H₅SO₂ 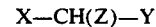 CH—CH₂CH=CH(CH₂)₃CH=CH₂ C₂H₅OOC | |
| 187 | PdCl₂ | 10.4 |
| 196 | PdCl₂[P cycloC₆H₁₁)₃]₂ | 15.8 |
| 207 | Pd[P(C₆H₅)₃]₂ HC—COOCH₃ ‖ HC—COOCH₃ | 15.8 |
| 208 | PdCl₂ [P(OC₆H₅)₃]₂ | 14.9 |

EXAMPLE 235

In a 100 ml. autoclave were charged 11.4 g. (0.05 mol) of C₆H₅SOCH₂COOC₂H₅, 0.35 g. (0.5 m. mol) of PdCl₂[P(C₆H₅)₃]₂, 0.58 g. (5 m. mol) of C₆H₅ONa, and 15 ml. of benzene The air in the autoclave was replaced with an argon gas, then charged with 10.2 g. (0.15 mol) of isoprene followed by stirring for 20 hours at 120°-130° C. After removing benzene, the reaction liquid this obtained was distilled under reduced pressure to provide 15.8 g. of C₆H₅SO₂CH(COOC₂H₅)CH₂—C(CH₃) = CHCH₂CH₂C(CH₃)CH = CH₂ (having a boiling point of 174°-176° C./ 10⁻⁴ mm. Hg.).

EXAMPLE 236

In a 100 ml. autoclave were charged 6.0 g. (0.034 mol) n—C₄H₉SO₂CH₂CONH₂, 0.35 g. (0.5 m. mol) of [PdCl₂ P(C₆H₅)₃]₂, 0.85 g. (5 m. mol) of C₆H₅ONa, 15 ml. of toluene and 10 ml (0.1 mol) of liquefied 1,3-butadiene followed by stirring for 20 hours at 140°-150° C. After removing toluene by distillation, the residue was distilled under reduced pressure to provide 6.9 g. of n—C₄H₉SO₂CH(CONH₂)CH₂ CH = CHCH₂CH₂₂CH = CH₂ (having a boiling point of 199°-200° C./10⁻³ mm. Hg., and a melting point of 87°-89° C.), 1.8 g. of n—C₄H₉SO₂C(CONH₂) (CH₂CH = CHCH₂CH₂CH₂CH = CH₂)₂ (having a boiling point of 227°-230° C./ 10⁻⁴ mm. Hg, melting point of 96°-98° C.).

EXAMPLE 237

In a 100 ml. autoclave were charged 9.3 g. (0.05 mol) of C₆H₅SOCH₂CONH₂, 0.35 g. (0.5 m. mol) of PdCl₂[P(C₆H₅)₃]₂, 0.58 g. of C₆H₅ONa, 30 ml. of acetone and 13 mol. (0.15 mol) of liquefied 1,3-butadiene followed by stirring for 20 hours at 120°-130° C. After removing acetone, by distillation, the product was distilled under reduced pressure to provide 13.2 g. of C₆H₅SO₂CH(CONH₂)CH₂CH = CH(CH₂)₃CH = CH₂ (having a boiling point of from 200° to 204° C./10⁻³ mm. Hg.).

EXAMPLE 238

The same procedure as above was repeated while using 10 g. (0.05 mol) of p—CH₃—C₆H₄SO₂CH₂CONH₂ instead of C₆H₅SOCH₂CONH₂ to provide 10.8 g. of p—CH₃C₆H₄SO₂C H(CONH₂)CH₂CH = CHCH₂CH₂CH₂CH = CH₂ (having a boiling point of from 213° to 216° C./10⁻³ mm. Hg.).

We claim:

1. A process for the preparation of 1,6-octadiene derivatives by the reaction between a compound represented by the general formula

X—CH(Z)—Y wherein X and Y each represent a member selected from the group consisting of CHO, COR', CO₂R" and, CON(R'''')₂, and, wherein R', R" and R''' each represents a monovalent hydrocarbon radical selected from the group consisting of an aliphatic group having from one to 10 carbon atoms, an alicyclic group having from six to 10 carbon atoms and an aromatic group having from six to 10 carbon atoms, R'''' represents a member selected from the group consisting of a hydrogen atom and a monovalent hydrocarbon radical as defined above, and R' may be an alkylene group having from two to 10 carbon atoms bonded to Z, when X or Y is COR' and Z represents a member selected from the group consisting of a hydrogen atom, an alkyl group having from one to eight carbon atoms, a cycloalkyl group having from six to eight carbon atoms and an aryl group having from six to eight carbon atoms, and Z may be an alkylene group having from two to 10 carbon atoms bonded to X or Y when X or Y is COR', and a 1,3-diene compound represented by the general formula

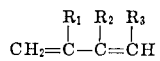

wherein $R_1$, $R_2$ and $R_3$ each represent a member selected from the group consisting of a hydrogen atom and an alkyl group having from one to six carbon atoms, in the presence of a palladium catalyst or platinum catalyst at a temperature of from 0° to 250° C, said platinum or palladium catalyst being selected from the group consisting of a. platinum or palladium inorganic salts,
b. platinum or palladium organic salts,
c. platinum or palladium complex compounds with trivalent phosphorus, arsenic and antimony compounds,
d. platinum or palladium complex compounds with organic ligands,
e. platinum or palladium complex compounds with ammonium compounds, and
f. platinum or palladium complex compounds with nitrogen-containing ligands.

2. A process according to claim 1 where a compound selected from the group consisting of alkali metals and basic alkali metal salts is used as cocatalyst together with a palladium catalyst or a platinum catalyst.

3. A process according to claim 1 where the reaction is carried out in the presence of a phenol.

4. A process according to claim 1 where the 1,3-diene compound is one selected from the group consisting of 1,3-butadiene, isoprene, 2,3-di-methylbutadiene, and 1,3-pentadiene.

5. A process for the preparation of 1,6-octadiene derivatives by the reaction between a compound represented by the general formula $$X-CH(Z)-Y$$

wherein X and Y each represent a member selected from the group consisting of COR' and $CO_2R''$, wherein R' and R'' each represents a monovalent hydrocarbon radical selected from the group consisting of an aliphatic group having from one to 10 carbon atoms, an alicyclic group having from six to 10 carbon atoms, and an aromatic group having from six to 10 carbon atoms, and R' may be an alkylene group having from two to 10 carbon atoms bonded to Z, when X or Y is COR' and Z represents a member selected from the group consisting of a hydrogen atom, an alkyl group having from one to eight carbon atoms, a cycloalkyl group having from six to eight carbon atoms and an aryl group having from six to eight carbon atoms, and Z may be an alkylene group having from two to 10 carbon atoms bonded to X or Y when X or Y is COR', and a 1,3-diene compound represented by the general formula

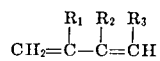

wherein $R_1$, $R_2$ and $R_3$ each represent a member selected from the group consisting of a hydrogen atom and an alkyl group having from one to six carbon atoms, in the presence of a palladium catalyst or platinum catalyst at a temperature of from 0° to 250° C., said platinum or palladium catalyst being selected from the group consisting of a. platinum or palladium inorganic salts,
b. platinum or palladium organic salts,
c. platinum or palladium complex compounds with trivalent phosphorus, arsenic and antimony compounds,
d. platinum or palladium complex compounds with organic ligands,
e. platinum or palladium complex compounds with ammonium compounds, and
f. platinum or palladium complex compounds with nitrogen-containing ligands.

6. A process according to claim 5, where a compound selected from the group consisting of alkali metals and basic alkali metal salts is used as cocatalyst together with a palladium catalyst or a platinum catalyst.

7. A process according to claim 5, where the reaction is carried out in the presence of a phenol.

8. A process according to claim 5, where the 1,3-diene compound is one selected from the group consisting of 1,3-butadiene, isoprene, 2,3-di-methylbutadiene, and 1,3-pentadiene.

* * * * *